(12) United States Patent
Ueno et al.

(10) Patent No.: US 11,001,949 B2
(45) Date of Patent: May 11, 2021

(54) SHEET MANUFACTURING APPARATUS, COMPOSITE MANUFACTURING METHOD, SHEET, AND COMPOSITE

(71) Applicant: SEIKO EPSON CORPORATION, Tokyo (JP)

(72) Inventors: Yoshihiro Ueno, Nagano (JP); Shunichi Seki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 16/456,015

(22) Filed: Jun. 28, 2019

(65) Prior Publication Data

US 2019/0316283 A1    Oct. 17, 2019

Related U.S. Application Data

(62) Division of application No. 15/023,064, filed as application No. PCT/JP2014/004012 on Jul. 30, 2014.

(30) Foreign Application Priority Data

Oct. 1, 2013  (JP) .................................. 2013-206157
Jun. 17, 2014 (JP) .................................. 2014-124057

(51) Int. Cl.
| | | |
|---|---|---|
| *D04H 1/70* | (2012.01) | |
| *D04H 1/60* | (2006.01) | |
| *D04H 1/732* | (2012.01) | |
| *D04H 1/736* | (2012.01) | |

(52) U.S. Cl.
CPC ................. *D04H 1/70* (2013.01); *D04H 1/60* (2013.01); *D04H 1/732* (2013.01); *D04H 1/736* (2013.01)

(58) Field of Classification Search
USPC ....................................... 162/128; 428/411.1
See application file for complete search history.

(56) References Cited

U.S. PATENT DOCUMENTS

| | | | |
|---|---|---|---|
| 4,865,788 A | 9/1989 | Davis | |
| 5,668,216 A | 9/1997 | Kinkel et al. | |
| 5,958,554 A | 9/1999 | Addie | |
| 6,008,150 A | 12/1999 | Thyssen et al. | |
| 8,148,357 B2 | 4/2012 | Okumura | |
| 2008/0199500 A1 | 8/2008 | Okumura | |
| 2009/0238916 A1 | 9/2009 | Grawe et al. | |
| 2015/0204015 A1* | 7/2015 | Gomi ................. | B29C 35/0277 162/261 |

FOREIGN PATENT DOCUMENTS

| | | |
|---|---|---|
| EP | 0629651 A1 | 12/1994 |
| EP | 1834979 A1 | 9/2007 |
| JP | 03-059070 A | 3/1991 |
| JP | 07-060846 A | 3/1995 |
| JP | 08-120551 A | 5/1996 |
| JP | 09-019907 A | 1/1997 |
| JP | 10-509923 A | 9/1998 |
| JP | 11-335955 A | 12/1999 |
| JP | 2001-113509 A | 4/2001 |
| JP | 2003-531308 A | 10/2003 |
| JP | 2006-291378 A | 10/2006 |
| JP | 2010-180313 A | 8/2010 |
| JP | 2013-001764 A | 1/2013 |
| WO | 00/78535 A1 | 12/2000 |

OTHER PUBLICATIONS

Extended European Search Report for the corresponding European Patent Application No. 14850191.9 dated Mar. 16, 2017.

* cited by examiner

*Primary Examiner* — Mark Halpern
(74) *Attorney, Agent, or Firm* — Global IP Counselors, LLP

(57) ABSTRACT

A composite integrally includes a resin and a coagulation inhibitor, and is used to be mixed with fibers. The composite is a powder whose volume average particle diameter is 1 μm or more to 100 μm or less, and at least a portion of the coagulation inhibitor is arranged in a surface of the composite.

13 Claims, 2 Drawing Sheets

US 11,001,949 B2

SHEET MANUFACTURING APPARATUS, COMPOSITE MANUFACTURING METHOD, SHEET, AND COMPOSITE

CROSS REFERENCES TO RELATED APPLICATIONS

This application is a divisional application of U.S. patent application Ser. No. 15/023,064, filed on Mar. 18, 2016. The entire disclosures of U.S. patent application Ser. No. 15/023,064, International Application No. PCT/JP2014/004012, Japanese Patent Application No. 2013-206157, filed on Oct. 1, 2013, and Japanese Patent Application No. 2014-124057, filed on Jun. 17, 2014 are incorporated by reference herein.

TECHNICAL FIELD

The present invention relates to a sheet manufacturing apparatus, a sheet manufacturing method, a sheet manufactured with the same, a composite used therewith and an accommodation container therefor.

BACKGROUND ART

Depositing a fiber-like material and causing a bonding force between the deposited fibers to obtain a sheet-like or film-like formed body has been performed for a long time. Typical examples thereof include manufacturing paper by pulp molding (paper-forming) using water. Even in present times, pulp molding is widely used as an example of a method of manufacturing paper. The paper manufactured by pulp molding generally includes a structure by cellulose fibers derived from wood or the like being entangled with one another, and being partially bonded to one another by a binder (paper strengthening agent (such as a starch paste and a water-soluble resin)).

According to the pulp molding, it is possible for the fibers to be deposited in a state where uniformity is favorable, and, in a case where a paper strengthening agent is used in the bonding between fibers, it is possible for the paper strengthening agent to be dispersed (distributed) in a state where the uniformity in the paper surface is good. However, because the pulp molding is a wet method, it is necessary to use large volumes of water, and the necessity of dewatering and drying or the like arises after forming the paper, and therefore the energy or time consumed is extremely large. It is necessary to suitably process the water used as waste water. Accordingly, it is difficult to respond to modern demands for energy savings, environmental protection, and the like. The apparatuses used in pulp molding frequently need large scale utilities and infrastructure such as water, power, and drainage facilities, and size reductions are difficult. From this viewpoint, there is an expectation of methods, referred to as dry methods, that use no or almost no water as paper manufacturing methods in place of pulp molding.

PTL 1 discloses a waste paper board formed by mixing and defibrating waste paper pulp and a thermal fusion bondable powder with a dry method, and subjecting these to hot pressing or the like.

CITATION LIST

Patent Literature

PTL 1: Japanese Unexamined Patent Application Publication No. 09-019907

SUMMARY OF INVENTION

Technical Problem

In the manufacturing of a sheet, there are cases of blending a coloring material (such as a pigment) in order to adjust the tone of the sheet. PTL 1 does not disclose the using of a coloring material. In a case of using a coloring material, there are cases where the pigment is detached due to outside forces such as undulation, impact, abrasion or the like in a case of forming a sheet by simply mixing the coloring material.

There are cases where the thermal fusion bondable powders coagulate with each other by simply mixing. In this case, when forming a sheet, a problem arises of possibly forming parts where the thermal fusion bondable powder becomes rough, not sufficiently bonding the pulp to each other at these parts, and lowering the strength of the sheet.

Solution to Problem

The invention was created in order to solve at least a part of the above problems, and can be realized in the following aspects or application examples.

According to an aspect of the invention, a composite integrally includes a resin and a coagulation inhibitor, and is used to be mixed with fibers. The composite is a powder whose volume average particle diameter is 1 μm or more to 100 μm or less, and at least a portion of the coagulation inhibitor is arranged in a surface of the composite.

According to another aspect of the invention, a composite used in a sheet manufacturing apparatus integrally includes a resin and a coagulation inhibitor. The composite is a powder whose volume average particle diameter is 1 μm or more to 100 μm or less, and at least a portion of the coagulation inhibitor is arranged in a surface of the composite.

According to still another aspect of the invention, a composite manufacturing method comprises a step of mixing a resin and a coloring material; a step of kneading the resin and the coloring material to form a mixture of the resin and the coloring material; a step of pelletizing the mixture to obtain a pellet after the step of kneading; a step of crushing the pellet to obtain a crushed material being a powder whose volume average particle diameter is 1 μm or more to 100 μm or less; and a step of mixing the crushed material and a coagulation inhibitor to obtain a composite integrally including the resin, the coloring material and the coagulation inhibitor. At least a portion of the coagulation inhibitor is arranged in a surface of the composite.

According to still another aspect of the invention, a sheet comprises a raw material including fibers and a composite integrally including a resin and a coagulation inhibitor, the composite is a powder whose volume average particle diameter is 1 μm or more to 100 μm or less, and at least a portion of the coagulation inhibitor is arranged in a surface of the composite. The fibers and the composite are bonded.

DESCRIPTION OF EMBODIMENTS

Below, various embodiments of the invention will be described. The embodiments described below are for describing examples of the invention. The invention is not limited in any way by the following embodiments, and includes various modifications carried out in a range not departing from the gist of the invention. Not all of the configurations explained below are indispensable configurations in the invention.

1. SHEET MANUFACTURING APPARATUS

Figure 1:
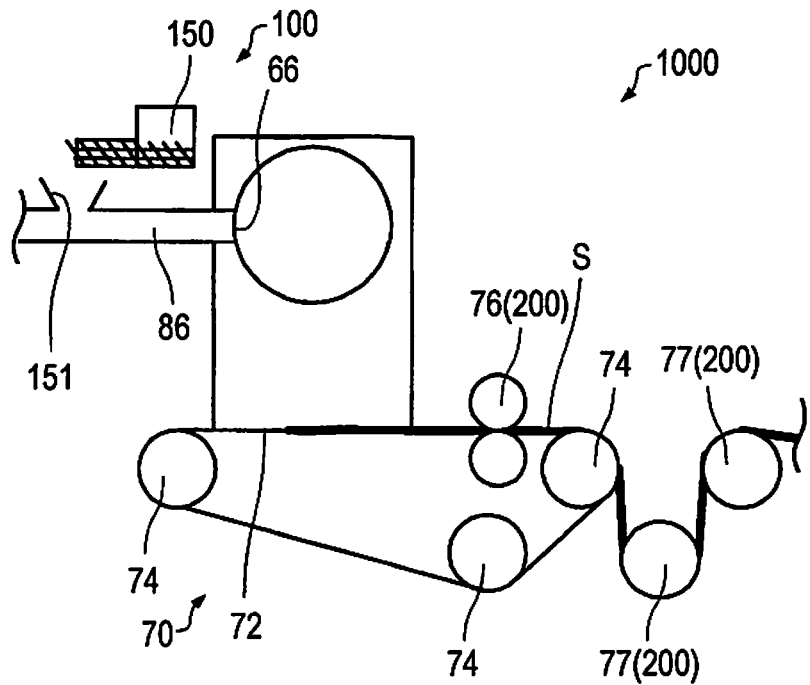
FIG. 1 is a schematic view of the main portions of a sheet manufacturing apparatus according to an embodiment.
Figure 2:
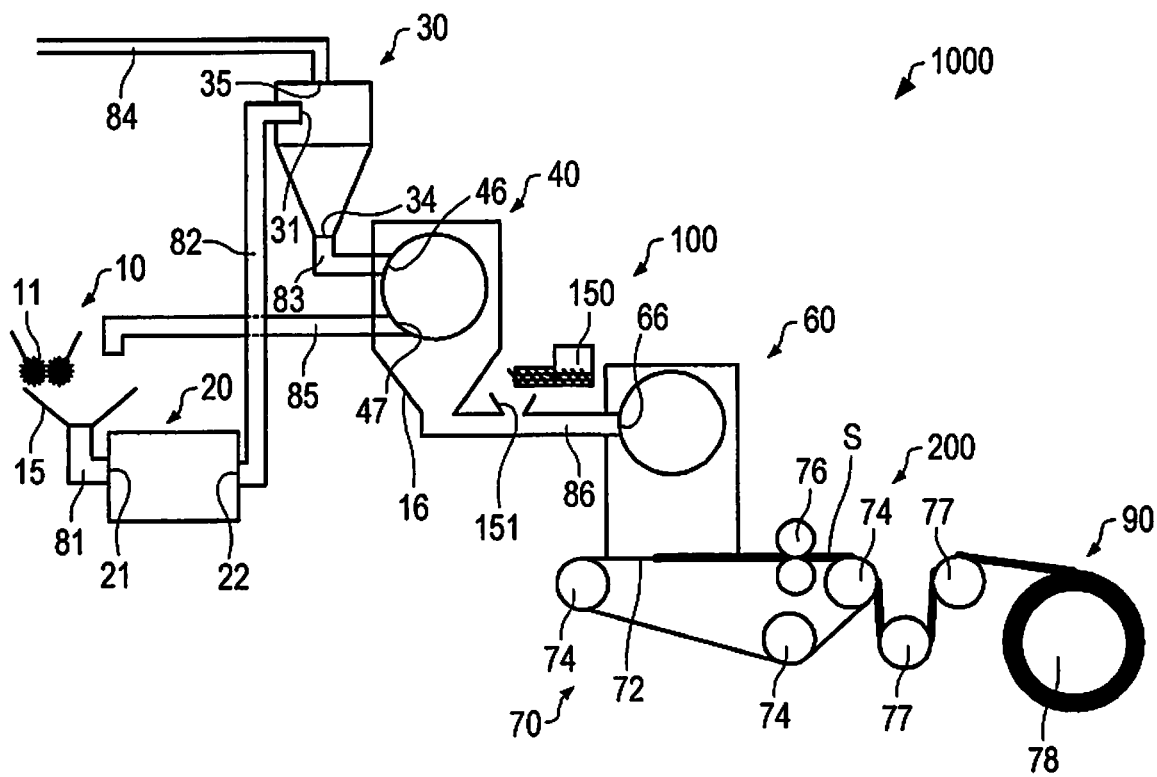
FIG. 2 is a schematic view of the sheet manufacturing apparatus according to the embodiment.
Figure 3:
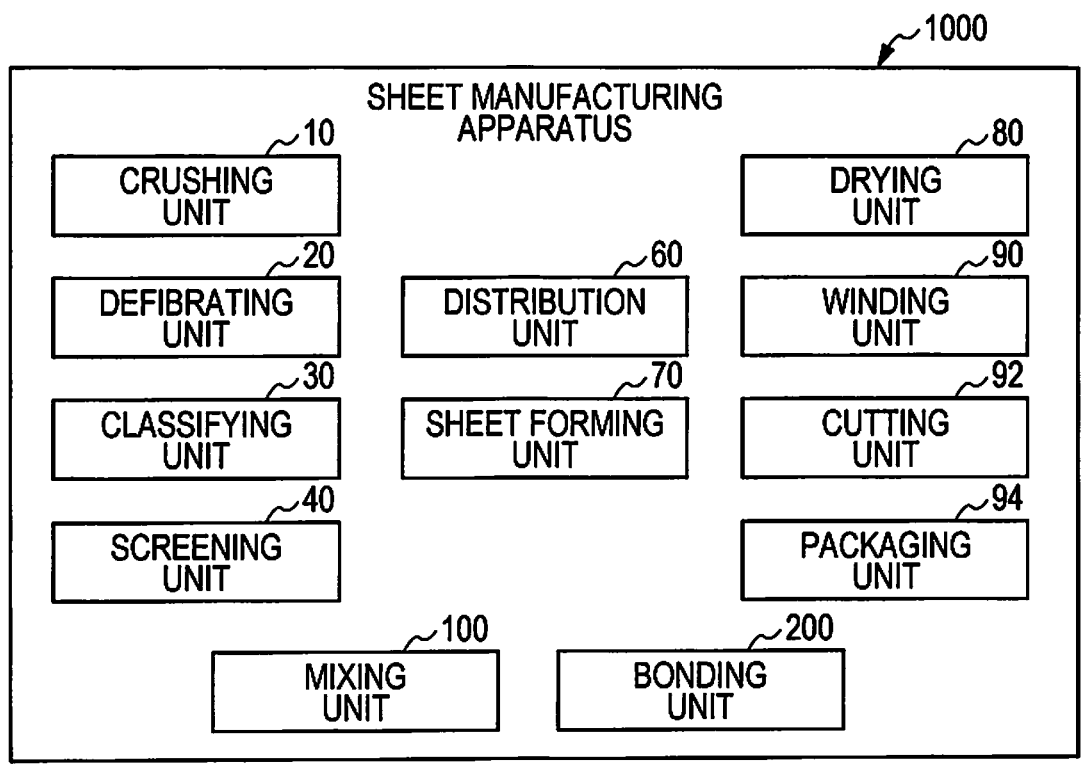
FIG. 3 is a diagram showing an example of a configuration of the sheet manufacturing apparatus.

The sheet manufacturing apparatus 1000 according to the embodiment is provided with a mixing unit 100 and a bonding unit 200. FIG. 1 is a schematic view of the main portions of the sheet manufacturing apparatus 1000 according to the embodiment. FIG. 2 is a schematic view of the sheet manufacturing apparatus 1000 according to the embodiment. FIG. 3 is a diagram showing an example of a configuration of the sheet manufacturing apparatus 1000 of the embodiment. The sheet manufacturing apparatus 1000 is provided with at least a mixing unit 100 and a bonding unit 200.

1.1. Mixing Unit

The mixing unit 100 has the function of causing the fibers (fibrous material) and the composite integrally including a resin and a coloring material to be mixed. At least the fibers and the composite are mixed in the mixing unit 100.

In the specification, there are cases where one fiber is indicated and cases where an aggregate of a plurality of fibers (a state such as cotton) is indicated when referring to fibers, a material in which a plurality of fibers is included is indicated when referring to a fibrous material, and the meaning of a fiber bundle and the meaning of a material (powder or cotton-like substance) that is a raw material in a sheet are included.

In the specification, particles formed with resin as a main component integrated with other components are referred to when referring to the composite. Although other components refers to coloring materials or coagulation inhibitors, and the like, shapes, sizes, materials or components having functions different to the resin that is the main component are also included.

When referring to the coloring material in the specification, cases where the substance itself is able to color the sheet and cases where an aggregation (powder) of particles formed from a substance able to color the sheet are included. The meaning of a sheet raw material is further included when referring to a coloring material.

In the specification, the wording "the fibers and the composite are mixed together" is defined as the composite being positioned between the fibers in a space (system) with a fixed volume.

As long as the mixing unit 100 is able to mix the fibers (fibrous material) and the composite together, the composition, the structure, the mechanism and the like are not particularly limited. The form of the mixing process in the mixing unit 100 may be batch processing, or may be either of a serial processing or continuous processing. The mixing unit 100 may be operated manually or may be operated automatically. Although the mixing unit 100 causes at least the fibrous material and the composite to be mixed together, other components may also be mixed together.

It is possible to give mechanical mixing or fluid dynamic mixing as an example of the mixing process in the mixing unit 100. Examples of the mechanical mixing include methods of introducing the fibers (fibrous material) and the composite into a Henschel mixer, a blower or the like and agitating with rotating blades, and methods sealing the fibers (fibrous material) and the composite in a bag and shaking the bag. Examples of the fluid dynamic mixing process include methods of introducing the fibers (fibrous material) and the composite in an airflow of the atmosphere or the like and diffusing the fibers (fibrous material) and the composite into one another in the airflow. In the method of introducing the fibers (fibrous material) and the composite in an airflow of the atmosphere or the like, the composite may be fed into a pipe or the like in which the fibers of the fibrous material flow (transfer) by the airflow, or the fibers (fibrous material) may be fed into a pipe or the like in which the particles of the composite flow (transfer) by the airflow. In this method, this is more preferable because the airflow in the pipe or the like being turbulent makes the mixing together efficient.

The mixing unit 100 is provided on the upstream side of a bonding unit 200, described later, in the flow direction of (a portion of) the raw material in the sheet manufacturing apparatus 1000. Other configurations may be included between the mixing unit 100 and the bonding unit 200. Examples of such other configurations include a forming unit that forms the mixture of the mixed fibers (fibrous material) and the composite into a web shape. The mixture (below, may be referred to as "mixed material") mixed together by the mixing unit 100 may be further mixed by another configuration such as a sheet forming unit.

As shown in FIG. 1, as the mixing unit 100, in a case of employing the pipe 86 as described above for the transfer of the fibers, there are methods of introducing the composite a state in which the fibers are caused to flow by the airflow of the atmosphere or the like. Examples of the generator of the airflow in the case of employing the pipe 86 in the mixing unit 100 include a blower, not shown, and, as long as the above functions are obtained, it is possible to use any generator, as appropriate.

Although it is possible the introduction of the composite in the case of employing the pipe 86 in the mixing unit 100 to be performed by the opening and closing operation of a valve or the hand of a user, it is possible for the introduction to be performed using a screw feeder or a disk feeder, not shown, or the like as the composite supplying unit 150 shown in FIGS. 1 and 2. Because it is possible to reduce the fluctuations in the content (addition amount) of the composite in the flow direction of the airflow by using these feeders, this is more preferable. The same also applies in a case of transferring the composite with the airflow and introducing the fibrous material to the airflow.

In the sheet manufacturing apparatus 1000 of the embodiment, it is preferable to select a dry-type form of the mixing unit 100. Here, the wording "dry-type" in the mixing refers to the state of being mixed together in air rather than in water. That is, the mixing unit 100 may function in the drying state, or may function in a state where a liquid present as an impurity or an intentionally added liquid is present. In the case of intentionally adding the liquid, it is preferable for the liquid to be added to an extent that the energy and time for removing the liquid through heat or the like do not increase excessively in later processes.

1.2. Bonding Unit

The sheet manufacturing apparatus 1000 according to the embodiment is provided with a bonding unit 200. The bonding unit 200 is installed further to the downstream side in the flow of the raw material than at least the above-described mixing unit 100.

The bonding unit 200 has a function of forming the fibers (fibrous material) and the composite mixed together in the above-described mixing unit 100, that is, a mixed material, into a predetermined shape. In the formed body (sheet) of the fibers and the composite formed in the bonding unit 200, a state in which the fibers and the composite are bonded is achieved.

In the specification, the wording "bonding the fibers and the composite" refers to a state in which the fibers and the composite are not easily separated, or a state in which the resin of the composite is arranged between the fibers, and the fibers become difficult to separate via the composite. The wording "bonding" is the concept that includes bonding and includes a state in which two or more types of substance come into contact and are not easily separated. The fibers may be parallel to or intersect one another when the fibers are bonded via the composite, or a plurality of fibers may be bonded to form one fiber.

In the bonding unit 200, the plurality of fibers is bonded via the composite by applying heat to the fibers and the composite mixed together in the mixing unit 100. In a case where resin that is one constituent component of the composite is a thermoplastic resin, when heated to at least a temperature in the vicinity of the glass-transition temperature (softening point) or melting point (case of a crystalline polymer), the resin softens or melts, and is fixed by the temperature lowering. It is possible for the fibers and the composite to bond to one another by the fibers coming into contact so as to become entangled with the resin softened, and the resin hardening. The fibers bond to each other by other fibers bonding when solidified. In a case where the resin of the composite is a heat-curable resin, the resin may be heated to the temperature of the softening point or higher, or may be heated to the curing temperature (temperature at which the curing reaction arises) or higher and it is possible to bond the fibers and the resin. It is preferable that the melting point, the curing point, the curing temperature and the like of the resin is lower than the melting point, the decomposition temperature, and the carbonization temperature of the fibers, and it is preferable that the type of both is combined and selected so as to have such a relationship.

In the bonding unit 200, pressure may be applied in addition to applying heat to the mixed material, and in this case, the bonding unit 200 includes a function of forming the mixed material into a predetermined shape. Although the magnitude of the pressure applied is regulated, as appropriate, according to the type of sheet formed, and 50 kPa or more to 30 MPa or less is possible. If the added pressure is low, a sheet with a large porosity is obtained, and if high, a sheet with a low porosity (high density) is obtained.

Examples of the specific configuration of the bonding unit 200 include, in addition to the heater roller 76 and the tension roller 77 as shown in FIGS. 1 and 2, a calender roller, a hot press molding machine, a hotplate, a hot air blower, an infrared heating device and a flash fixing device.

1.3. Other Configurations

The sheet manufacturing apparatus 1000 of the embodiment may include, as appropriate, a configuration for pre-processing, a configuration for intermediate processing, a configuration for post processing and the like, in addition to the above-described mixing unit 100 and bonding unit 200. FIG. 2 schematically shows an example of the sheet manufacturing apparatus 1000, and FIG. 3 shows an example of the configuration of the sheet manufacturing apparatus 1000.

Examples of the configurations for preprocessing that is a configuration that performs processing of the fibers (fibrous material) or composite introduced to the mixing unit 100 include the crushing unit 10 (shredder or the like) that cuts the pulp sheet or waste paper or the like as a raw material in air, the defibrating unit 20 that untangles the raw material in air into a fiber form, the classifying unit 30 that classifies impurities (toner or paper strengthening agent) from the defibrated material that is defibrated and the fibers (short fibers) shortened by the defibration in air, and the screening unit 40 that screens the long fibers (long fibers) from the defibrated material and the undefibrated pieces that are insufficiently defibrated in air. Examples of the configuration for the intermediate processing that is a configuration for performing appropriate processing until the composite and the fiber (mixed material) mixed by the mixing unit 100 are introduced to the bonding unit 200 include the distribution unit 60 that causes the mixed material to descend while being dispersed in air, and a sheet forming unit 70 that deposits the mixed material caused to descend from the distribution unit 60 and forms the mixed material into the shape of a web. The bonding unit 200 may be a portion of the sheet forming unit 70. Examples of the configuration for post processing that is a configuration that performs processing on the sheet S formed by the bonding unit 200 include the drying unit 80 (FIG. 3) which causes the sheet S to be dried as necessary, a winding unit 90 that winds the formed sheet into a roll shape, a cutting unit 92 (FIG. 3) that cuts the formed sheet into a stipulated side, and a packaging unit 94 (FIG. 3) that packages the wound or cut sheet with a film or packaging paper.

It is possible for the sheet manufacturing apparatus 1000 of the embodiment to have configurations other than the configurations given as examples above, and possible to have, as appropriate, a plurality of configurations according to the purpose with the above-described configuration included. The order of each configuration is not limited, and is able to be designed, appropriate, according to the purpose.

Below, a summary of each configuration will be described.

The crushing unit 10 cuts the raw material, such as the pulp sheet or fed sheet (for example, A4 sized waste paper) in air into small pieces. The shape and size of the small pieces, although not particularly limited, is, for example, several cm squared. In the examples in the drawings, the crushing unit 10 includes a crushing blade 11, and it is possible for the fed raw materials to be cut by the crushing blade 11. An automatic feeding unit (not shown) for continuously feeding the raw material may be provided in the crushing unit 10.

The small pieces cut by the crushing unit 10 are transported to the defibrating unit 20 via the first conveyance unit 81 when received by the hopper 15. The first conveyance unit 81 is communicated with the introduction port 21 of the defibrating unit 20. The shape of the first conveyance unit 81 and the second to sixth conveyance units 82 to 86, described later, is a pipe shape. In the example in the drawings, the sixth conveyance unit 86 configures a portion of the mixing unit 100, and shares a reference with the above-described pipe 86 because of being the same.

The defibrating unit 20 performs defibration treatment on the small pieces (defibration object). The defibrating unit 20 generates fibrous untangled fibers by subjecting the small pieces to defibration treatment.

Here, the wording "defibration treatment" refers to untangling the small pieces in which the plurality of fibers is bonded into individual fibers. The material that passes through the defibrating unit 20 is referred to as a "defibrated material". There are also cases where resin (resin for causing a plurality of fibers to bond to one another) isolated from the fibers when the fibers are untangled, additives such as blur-preventing agents and paper strengthening agents, and colorants such as ink and toner are included in the "defibrated material" in addition to the untangled defibrated material fibers. In the description that follows, the wording "defibrated material" is at least a portion of the material passing through the defibrating unit 20, and may be mixed with materials added after passing through the defibrating unit 20.

The defibrating unit 20 isolates the additives and the colorants from the fibers. The additives or colorants are discharged from the discharge port 22 along with the defibrated material. The defibrating unit 20 performs the defibration treatment on the small pieces introduced from the introduction port 21 by a rotary blade. The defibrating unit 20 performs defibrating with a dry method in air.

The configuration of the defibrating unit 20 is not limited, and possible examples include units that generate an airflow by a rotator rotating, and defibrate the defibration object with the airflow. The defibrating unit 20 may include a mechanism that causes an airflow to be generated. In this case, it is possible for the defibrating unit 20 to suction the small pieces along with the airflow from an introduction port 21, perform the defibration treatment, and transport the raw material to the discharge port 22 with the self generated airflow.

The defibrated material discharged from the discharge port 22 is introduced to the classifying unit 30 via the second conveyance unit 82, as shown in FIG. 2. In a case of using a defibrating unit 20 not including an airflow generating mechanism, a mechanism that generates an air flow that introduces the small pieces to the introduction port 21 may be separately provided on the upstream or downstream side of the defibrating unit 20.

The classifying unit 30 isolates and removes the additives or colorants from the defibrated material. An airflow classifier is used as the classifying unit 30. The airflow classifier generates a swirling airflow, and performs isolation according to the size and density of the materials classified with centrifugal force, and it is possible to adjust the classification points through adjustment of the speed of the airflow and the centrifugal force. Specifically, a cyclone, an elbow jet, an eddy classifier and the like are used as the classifying unit 30. In particular, it is possible for the cyclone to be favorably used as the classifying unit 30 because the structure is simple. Below, a case of using a cyclone as the classifying unit 30 will be described.

The classifying unit 30 includes at least an introduction port 31, a lower discharge port 34 provided on the lower portion, and an upper discharge port 35 provided on the upper portion. In the classifying unit 30, the airflow in which the defibrated material introduced from the introduction port 31 is carried is caused to move circularly, and, in so doing, centrifugal force is applied to the introduced defibrated material, and the material is isolated into a first classified material (untangled fibers) and a second classified material (additive or colorant) with a lower density than the first classified material. The first classified material is used as the raw material of the sheet. The second classified material is removed because of becoming a hindrance when forming the sheet. For example, the whiteness of the sheet when the sheet includes toner is lowered. The strength of the sheet when materials smaller than the fibers are included is lowered. The first classified material is discharged from the lower discharge port 34 and is introduced to the introduction port 46 of the screening unit 40 through the third conveyance unit 83. Meanwhile, the second classified material is discharged to the outside of the classifying unit 30 from the upper discharge port 35 through the fourth conveyance unit 84. In this way, because the resin is discharged to the outside by the classifying unit 30, even if the resin is supplied by the composite supplying unit 150, described later, it is possible to prevent the resin from becoming surplus with respect to the defibrated material.

Although classifying the first classified material and the second classified material by the classifying unit 30 is disclosed, isolation is not always reliably performed. Comparatively small or less dense materials from the first classified material may be discharged to the outside along with the second classified material. Comparatively high density materials or materials entangled with the first classified material from the second classified material may be introduced to the screening unit 40 along with the first classified material. In a case of a pulp sheet without waste paper as the raw material, because materials corresponding to the second classified material are not included, the classifying unit 30 may be not provided as the sheet manufacturing apparatus 1000.

The screening unit 40 screens, in air, the defibrated material subjected to defibration treatment into "passing-through material" that passes through the screening unit 40 and "residue" that does not pass through. A cylindrical sieve is used as the screening unit 40. The screening unit 40 includes an introduction port 46 and an discharge port 47, as shown in FIG. 2. The screening unit 40 is a rotating sieve which large materials that are able to pass through the sieve pass through and large materials that are not able to pass through the first opening 42 do not pass through. It is possible for the screening unit 40 to screen the short fibers (passing-through material) according to a fixed length from the defibrated material subjected to the defibrating treatment by the sieve.

The residue not passing through the sieve of the screening unit 40 is discharged from the discharge port 47 and transported to the hopper 15 via the fifth conveyance unit 85 as a return flow path, and is returned again to the defibrating unit 20, as shown in FIG. 1.

The passing-through material passing through the sieve of the screening unit 40 is transported to the introduction port 66 of the distribution unit 60 via the sixth conveyance unit 86 (pipe 86) one received by the hopper 16. A supply port 151 for the composite (described later) that causes the fibers to bond to one another (defibrated materials to bond to one another) to be supplied is provided in the sixth conveyance unit 86.

The composite supplying unit 150 supplied the composite in air from the supply port 151 to the sixth conveyance unit 86 (pipe 86). That is, the composite supplying unit 150 supplies the composite to the path in which the passing-through material of the screening unit 40 moves from the screening unit 40 to the distribution unit 60 (between the screening unit 40 and the distribution unit 60). Although the composite supplying unit 150 is not particularly limited as long as it is able to supply the composite to the sixth conveyance unit 86 (pipe 86), and a screw feeder, circle feeder and the like are used. The composite supplied from the composite supplying unit 150 will be described later.

As a result of the passing-through material and the composite of the screening unit 40 passing through the sixth conveyance unit 86 (pipe 86), the mixed material is formed until the distribution unit 60. Accordingly, in the sheet manufacturing apparatus 1000 of the embodiment, the mixing unit 100 is configured to include the composite supplying unit 150 and the sixth conveyance unit 86 (pipe 86). The mixed material may be further mixed in the distribution unit 60. Therefore, the distribution unit 60 may be a mixing unit 100.

The distribution unit 60 refines the entangled passing-through material. The distribution unit 60 may further refine the entangled composite in a case where the composite supplied from the composite supplying unit 150 is fibrous. The distribution unit 60 evenly deposits the passing-through material and the composite on the deposition unit 72, described later.

A sieve is used as the distribution unit 60. The distribution unit 60 is a rotating sieve that is able to rotate due to a motor (not shown).

The distribution unit 60 includes an introduction port 66. The difference in terms of configuration between the distribution unit 60 and the screening unit 40 is not including an discharge port (part corresponding to the discharge port 47 of the screening unit 40).

The upper limit of the size of the openings in the sieve of the distribution unit 60 is 5 mm. It is possible for materials to be refined and pass through without lumps in which the fibers are entangled with each other passing through by the size of the openings being 5 mm or less. Even if entangled fibers or the composite are present when mixed in the sixth conveyance unit 86, they are refined when passing through the distribution unit 60. Therefore, the fibers and the composite are deposited on the deposition unit 72, described later, with a uniform thickness and density.

The wording "refine the entangled fibers" includes a case of completely refining the entangled fibers (case of all of the fibers reaching a refined state) and a case of refining a portion of the entangled fibers to the extent that the entangled fibers are able to pass through the sieve. The same applies to the meaning of the wording "refine the entangled composite".

The wording "uniformly deposited" refers to a state of the deposited material that is deposited being deposited at the same thickness and the same density. However, because the all of the deposited material is not necessarily manufactured as a sheet, the part that becomes the sheet may be uniform.

The defibrated material and the composite passing through the distribution unit 60 are deposited on the deposition unit 72 of the sheet forming unit 70. The sheet forming unit 70, as shown in FIGS. 1 and 2, includes the deposition unit 72, the tension roller 74, the heater roller 76, the tension roller 77, and the winding roller 78. The sheet forming unit 70 forms a sheet using the defibrated material and the composite passing through the distribution unit 60. In the examples in the drawings, the heater roller 76 and the tension roller 77 of the sheet forming unit 70 configure the above-described bonding unit 200.

The deposition unit 72 of the sheet forming unit 70 receives and causes the defibrated material and the composite passing through the distribution unit 60 to be deposited. The deposition unit 72 is positioned below the distribution unit 60. Since the deposition unit 72 receives the defibrated material and the composite, for example, the deposition unit 72 is a mesh belt. The mesh tensioned by the tension roller 74 is formed on the mesh belt. The deposition unit 72 moves through the tension roller 74 rotating. A web with a uniform thickness is formed on the deposition unit 72 by the defibrated material and the composite from the distribution unit 60 continuously accumulating while the deposition unit 72 continuously moves.

The defibrated material and the composite deposited on the deposition unit 72 of the sheet forming unit 70 is heated and pressed by passing through the heater roller 76 according to the movement of the deposition unit 72. Due to the heat, the resin functions as a bonding agent and causes the fibers to bond to each other, is thinned by the pressure, and the sheet S is formed. The surface may be further smoothened by being passed through a calender roller, not shown. In the examples in the drawings, the sheet S is wound onto the winding roller 78. Through the above, it is possible to manufacture the sheet S.

2. FIBER

In the sheet manufacturing apparatus 1000 of the embodiment, the fibers (fibrous material) used as a portion of the raw material is not particularly limited, and it is possible for a wide range of fiber materials to be used. Examples of the fibers include natural fibers (animal or plant fibers) and chemical fibers (organic, inorganic or organic-inorganic composite fibers), and more specifically, examples include fibers made from cellulose, silk, wool, cotton, hemp, kenaf, flax, Ramie, jute, manila hemp, sisal hemp, softwood, and hardwood, and fibers made from rayon, lyocell, cupra, vinylon, acrylic, nylon, aramid, polyester, polyethylene, polypropylene, polyurethane, polyimide, carbon, glass, and metal and these may be used independently or mixed, as appropriate, or may be used as a regenerated fiber on which purification or the like is performed. At least one of these fibers may be included as the raw material. The fiber may be dried or may be contained or be impregnated with a liquid such as water or an organic solvent. Various surface treatments may be performed. The material of the fibers may be a pure material, or may be a material that includes various components such as impurities, additives and other components.

The fibers used in the sheet manufacturing apparatus 1000 of the embodiment is string-like or ribbon-like, and may be one independent fiber or may be a plurality of fibers completely entangled with one another to form a string shape or a ribbon shape. The fibrous material may be formed in a cotton-like form, or may be a form in which a plurality of fibers may be partially physically or chemically bonded to one another. The structure of the fibers may be formed from one type of material, a so-called simple fiber, or the material may be continuously or step-wise modified from the center portion toward the outer peripheral portion. Examples of step-wise modifying the material from the central portion of the fiber toward the outer peripheral portion include a so-called core-sheath structure. The fibers may be in a linear form, may be in a curved form, or may further be in a curled form overall. The shape of the cross-sectional of the fibers is not particularly limited, and may be a circle, an ellipse, a polygon, or a combination thereof. The fibers may also be fibrillated fibers.

When the fibers used in the embodiment are made one independent fiber, the average diameter (in a case where the cross-section is not a circle, the diameter of a circle when a circle having the greatest length from the lengths in a direction perpendicular to the length direction or equivalent to the area of the cross-section (equivalent circle diameter) is assumed) thereof is 1 µm or more to 1000 µm or less, 2 µm or more to 500 µm or less is preferable, and 3 µm or more to 200 µm or less is more preferable.

Although the length of the fibers used by the sheet manufacturing apparatus 1000 of the embodiment is not particularly limited, in one independent fiber, the length along the length direction of the fiber is 1 µm or more to 5 mm or less, 2 µm or more to 3 mm or less is preferable, and 3 µm or more to 2 mm or less is more preferable. In a case where the length of the fibers is short, although the strength of the sheets may be insufficient because the fibers do not easily bond with the composite, it is possible to obtain a sufficiently strong sheet as long as the length is within the above ranges. The length along the length direction of the fibers may be the distance (length of the fibers) between both ends when both ends of one independent fiber is stretched so as not to break, as necessary, and placed in a substantially linear state in this state. The average length of the fibers, as the length-length-weighted mean fiber length, is 20 µm or more to 3600 µm or less, 200 µm or more to 2700 µm or less is preferable, and 300 µm or more to 2300 µm or less is more preferable. The length of the fibers may have variations (distribution), and in a case where a normal distribution in a distribution obtained with an n of 100 or more is assumed, the δ for the length of one independent fiber may be 1 µm or more to 1100 µm or less, preferable 1 µm or more to 900 µm or less, and more preferably 1 µm or more to 600 µm or less.

It is possible to measure the thickness and length of the fibers with various optical microscopes, scanning electron microscopes (SEM), transmission electron microscopes, fiber testers, or the like. In a case of microscopic observation, cross-sectional observation and observation in a state where both ends of the one independent fiber are stretched so as to not be cut away, as necessary, can be performed by carrying out pretreatment, as appropriate, on the observation sample, as necessary.

In the specification, the wording "cotton-like" indicates a state of having a three-dimensional bulky external shape due to one long fiber or a plurality of fibers being entangled with one another or coming partially into contact with one another. That is, cotton-like indicates a solid shape formed by entanglement or partial contact of the fibers, and a gas partially encapsulated in the shape. The phrasing cotton-like is used regardless of whether or not the plurality of fibers are bonded to one another.

3. COMPOSITE OF RESIN AND COLORING AGENT

In the sheet manufacturing apparatus 1000 of the embodiment, the composite used as a portion of the raw material integrally includes a resin and a coloring material.

The state of the composite integrally including the resin and the coloring material refers to a state where the resin or coloring material from the composite do not easily break part (not easily drop off) in either or both of the sheet manufacturing apparatus 1000 or the manufactured sheet S. That is, the state of the composite integrally including the resin and the coloring material indicates a state in which the coloring materials are bonded to one another by the resin, a state where the coloring material is structurally (mechanically) fixed to the resin, a state where the resin and the coloring material are coagulated due to electrostatic force or Van der Waal's forces, and a state in which the resin and the coloring material are chemically bonded. The state of the composite integrally including the resin and the coloring material may also be a state where the coloring material is encapsulated in the resin or may be a state where the coloring material is attached to the resin, and includes a state where both states are present at the same time. The same also applies to a case of integrally including the resin and the coagulation inhibitor, described later.

Figure 4:
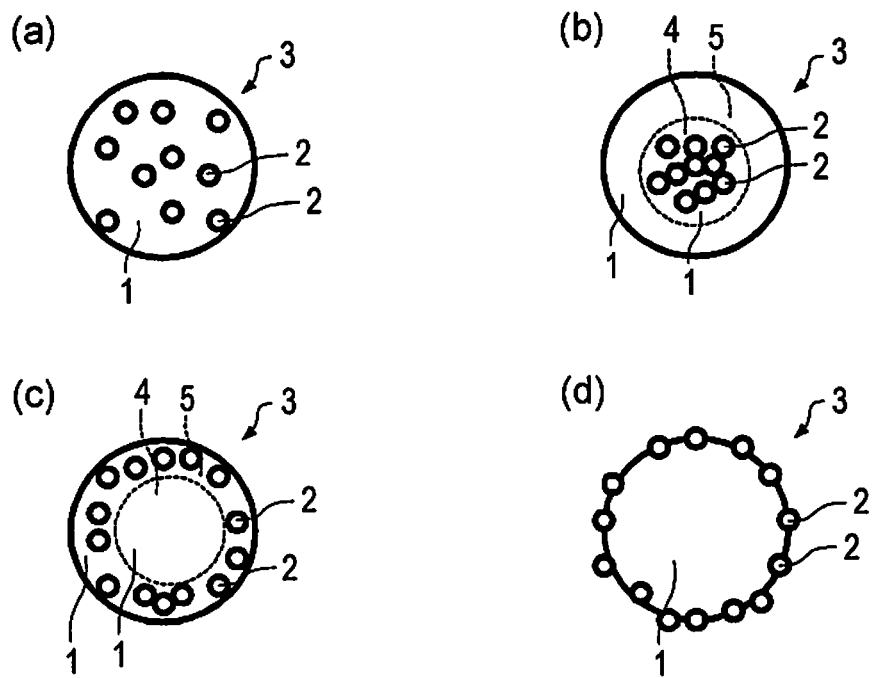
FIG. 4 shows schematic views of several examples of cross-sections of a composite according to the embodiment.

FIG. 4 schematically shows several states of cross-sections of the composite in which the resin and the coloring materials are integrally included. Examples of the specific form of the composite integrally including the resin and the coloring material include a composite 3 having a structure in which a single or a plurality of coloring materials 2 is dispersed and encapsulated inside the resin 1 as shown in FIGS. 4(a) to 4(c), and a composite 3 in which a single or a plurality of coloring materials 2 is attached to the surface of the resin 1 as shown in FIG. 4(d). In the sheet manufacturing apparatus 1000 of the embodiment, it is possible to use an aggregate (powder) of such a composite 3 as the composite.

FIG. 4(a) shows an example of the composite 3 having a structure in which a plurality of coloring materials 2 (drawn as particles) is dispersed in the resin that configures the composite 3. Such a composite 3 forms a so-called sea-island structure with the resin 1 dispersed as a matrix and the coloring material 2 as the domain. In the example, because of the state in which the coloring material 2 is surrounded by the resin 1, it is difficult for the coloring material 2 to pass through the resin part (matrix) and be separate to outside the resin 1. Therefore, when various processes are received or when the sheet is formed in the sheet manufacturing apparatus 1000, the coloring material 2 is in a state of not easily dropping off from the resin part. The coloring material 2 may come in contact with itself or the resin 1 may be present between the coloring material 2 in the dispersion state the coloring material 2 inside the composite 3 in this case. In FIG. 4(a), although the coloring material 2 is entirely dispersed, dispersion may be biased toward one side. In the drawing, the coloring material 2 may be only on the right side or the left side. As a coloring material biased to one side, the coloring material 2 may be arranged in the center portion of the resin 1 as in FIG. 4(b) or the coloring material 2 may be arranged in a part near the surface of the resin 1 as in FIG. 4(c). The resin 1 may include a mother particle 4 in the vicinity of the center and a shell 5 on the periphery thereof. The mother particle 4 and the shell 5 may be the same type of resin as one another or may be differing types of resin.

The example shown in FIG. 4(d) is the composite 3 with a form in which the coloring material 2 is embedded in the vicinity of the surface of particles formed from the resin 1. In the example, although the coloring material 2 is exposed in the surface of the composite 3, it is possible to attain a state in which the composite 3 does not easily fall off from the composite 3 through bonding (chemical or mechanical bonding) with the resin 1 or mechanical fixing due to the resin 1, and to suitably use such a composite 3 in the sheet manufacturing apparatus 1000 of the embodiment as the composite integrally including the resin 1 and the coloring material 2. In the example, the coloring material 2 may be present not only in the surface of the resin 1, but also on the interior.

Although several forms of the composite integrally including the resin and the coloring material are given as examples, as long as the coloring material does not easily drop off from the resin when various treatments are received in the sheet manufacturing apparatus 1000 or when the sheet is formed, there is no limitation to these forms, and a state in which the coloring material is attached by electrostatic force or Van der Waal's forces to the surface of the resin particles, the coloring material does not easily fall off from the resin particles. It is possible to adopt any form in which the coloring material does not easily drop off from the composite even in a form in which the above-described plurality of forms is combined with one another.

The coloring material includes a function making the color of the sheet S manufactured by the sheet manufacturing apparatus 1000 of the embodiment into a predetermined color. It is possible for a dye or a pigment to be used as the coloring material, and in a case of integrally including the resin in the composite, it is preferable to use a pigment from the viewpoint of obtaining a better hiding power or chromagenicity.

The pigment, along with the color and type thereof is not particularly limited, and it is possible to use various colors (such as white, blue, red, yellow, cyan, magenta, yellow, black, and special colors (pearl, metallic gloss)) of pigment used in ordinary inks. The pigment may be an inorganic pigment or may be an organic pigment. It is possible to use known pigments disclosed in Japanese Unexamined Patent Application Publication No. 2012-87309 or Japanese Unexamined Patent Application Publication No. 2004-250559 as the pigment. White pigments and the like such as zinc oxide, titanium oxide, antimony white, zinc sulfide, grey, silica, white carbon, talc, alumina white may be used. These pigments may be used either independently or mixed, as appropriate. In a case of using a white dye, it is more preferable to use a pigment formed from a powder that includes particles (pigment particles) with titanium oxide as a main component from the above-described examples on the point of ease of increasing the whiteness in the manufactured sheet S from the magnitude of the refractive index of the titanium oxide with a small blending amount.

In the specification, the phrasing "coloring material" is used to signify a material for coloring. In the specification, in a case of a pigment, this includes the meaning of a powder in which a plurality of single particles (pigment particles) thereof are aggregated. The wording "single particle (pigment particle)" refers to particles which are difficult to make smaller than the above by an ordinary crushing unit. In the white pigment in which the material is titanium oxide, the single particle (pigment particle) may be fine crystals of titanium oxide as the primary particles, and a plurality of primary particles may be aggregated. The coagulation between primary particles in this case may aggregate when forming chemical bonds or twin crystals, a mechanical crushing is frequently difficult. The structure of one pigment particle may be the particle itself or a bonded body of primary particles being the primary particle.

The method of integrally including the resin and the coloring material to the composite is not particularly limited even in a case of adopting the structure of nay of the above-described FIGS. 4(*a*) to 4(*d*), and it is possible to use, as appropriate, known methods. An example of the method of obtaining the composite of the form is described in the above-described FIG. 2. Examples of the method of obtaining the composite of the form in FIG. 4(*a*) include a melt-kneading method of heating a predetermined resin to the temperature of the softening point or higher and kneading with the pigment (coloring material) and a method of mixing the resin with the pigment while being dissolved or swelled with water or a solvent. Examples of devices usable with these methods include a kneader, a Banbury mixer, a single screw extruder, a multi-screw extruder, a twin roll, a triple roll, a continuous kneader, and a continuous twin roll. In a case of using these methods, the pigment may be subjected to a hydrophobization treatment in order for the pigment to be more uniformly dispersed in the resin. In a case where a coagulated mass of the pigment is present before the melt-kneading, it is effective to disperse the pigment uniformly in the resin by crushing the coagulated mass with a mixer or the like.

It is possible to obtain the composite by pelletizing and crushing with an appropriate method after kneading. It is possible to perform the crushing using a known crushing method. Examples of the crushing machine used include a hammer mill, a pin mill, a cutter mill, a pulverizer, a turbo mill, a disk mill, a screen mill, and a jet mill, and it is possible to obtain the resin particles by combining these, as appropriate. The process of crushing may be performed stepwise, such as finely crushing to a target particle diameter after first roughly crushing so that the particle diameter becomes approximately 1 mm. Even in such a case, it is possible to use the appropriate devices given above in each step. It is further possible to use a freeze-crushing method for improving the crushing efficiency of the composite. There are cases where the composite obtained in this way includes various sizes, and in order to make the composite into the target size, the composite may be classified using a known classifying device. If the above methods are adopted, it is possible to obtain a composite with the structure as shown in FIG. 4(*a*).

It is preferable for the content of the coloring material in the composite to be greater than 0% by mass to 50% by mass or less. The content of the coloring material in the composite is greater than 0 parts by weight to 100 parts by weight or less when expressed in terms of parts by weight (external addition: addition amount of the coloring material to the resin). It is preferable that the content of the coloring material in the composite is, from the viewpoints of obtaining sufficiently strong coloring of the manufactured sheet, of suppressing dropping off of the coloring material from the composite, and of stability (suppressing brittle collapse of the composite due to impact or the like) of the shape of the composite, 1% by mass or more to 50% by mass or less, and 2% by mass or more to 30% by mass or less is more preferable, and 3% by mass or more to 20% by mass or less is still more preferable.

4. COMPOSITE OF RESIN AND COAGULATION INHIBITOR

A coagulation inhibitor may be blended into the composite or the powder that includes the composite. The coagulation inhibitor, in a case of being blended in the composite, has a function of making the composite integrally including the resin and the coloring material not coagulate to each other compared to a case of not being blended. Although various coagulation inhibitors can be used, in the sheet manufacturing apparatus 1000 of the embodiment, it is preferable to use a type (may be coated (covered) or the like) arranged in the surface of the composite because little to no water is used. When considering the coagulation inhibition effect, the composite may not integrally include the coloring material or the coloring material may not be used. In the sheet manufacturing apparatus 1000 of the embodiment, the composite used as a portion of the raw material integrally includes a resin and a coagulation inhibitor.

Examples of the coagulation inhibitor include fine particles formed from an inorganic material, and it is possible to obtain an extremely superior coagulation inhibition effect by blending the particles in the surface of the composite as in FIG. 4(*d*). Therefore, reference 2 in FIG. 4(*d*) may be the coagulation inhibitor.

The wording "coagulation" indicates a state where the same or different types of substance are present in physical contact due to electrostatic force or Van der Waal's forces. In a case of a state of not coagulating in the aggregate (for example, powder) of the plurality of substances, all of the substances that configure the aggregation being arranged while discrete is not necessarily indicated. That is, a state in which a portion of the substance that configures the aggregation is coagulated is also included in the state of not being coagulated, and the even if the content of such a coagulated substance is approximately 10% by mass or less of the entire aggregation, and preferably approximately 5% by mass or less, this state is included in the "state of not being coagulated" in the aggregate of the plurality of substances. A case where, although the particles of the powder are in a state of being present in contact with each other, cases where it is possible to put the particles into a discrete state by adding sufficient outside force that the particles are not broken down, such as gentle agitation, dispersing due to an airflow, and freely dropping in a case where the powder is bagged or the like are included in the state of not being coagulated.

Specific examples of the material of the coagulation inhibitor include silica, titanium oxide, aluminum oxide, zinc oxide, cerium oxide, magnesium oxide, zirconium oxide, strontium titanate, barium titanate, and calcium carbonate. Although a portion of the material of the coagulation inhibitor is the same material as the coloring material, the materials differ in that the particle diameter of the coagulation inhibitor is smaller than the particle diameter of the coloring material. Therefore, therefore, because the coagulation inhibitor does not greatly influence the tone of the manufactured sheet, in the specification the coagulation inhibitor can be distinguished from the above-described coloring material. However, when regulating the tone of the sheet, even if the particle diameter of the coagulation inhibitor is small, because a slight effect of light scattering or the like arises, it is preferable for such an effect to be taken into consideration.

The average particle diameter (number average particle diameter) of the coagulation inhibitor particles, although not particularly limited is 0.001 to 1 µm, and more preferably 0.008 to 0.6 µm. Although the coagulation inhibitor particles being the primary particles is normal in light of being close to the category of so-called nanoparticles, and the particle diameter being small, a plurality of primary particles may be bonded to form a higher order particle. If the particle diameter of the coagulation inhibitor primary particles is within the above ranges, it is possible to favorable coat the surface of the composite, and possible to impart a sufficient coagulation inhibition effect. When the coagulation inhibitor is arranged in the surface of the composite, the coagulation inhibitor is present between different composites and it is possible to suppress coagulation. When the composite and the coagulation inhibitor are separate bodies, because the coagulation inhibitor is not limited to being present between the different composites, and there as cases where the composites coagulate with each other.

It is possible to obtain the above effects if the addition amount in the case of adding the coagulation inhibitor to the composite is made 0.1 parts by weight or more to 5 parts by weight or less with respect to 100 parts by weight of the composite, and from the viewpoint of either or both of increasing the effect and suppressing dropping off the of the coagulation inhibitor from the manufactured sheet, 0.2 parts by weight or more to 4 parts by weight or less with respect to 100 parts by weight of the composite is preferable, and 0.5 parts by weight or more to 3 parts by weight or less is more preferable.

The method of arranging (coating) the coagulation inhibitor in the surface of the composite is not particularly limited, and the coagulation inhibitor may be arranged along with the resin and the coloring materials when forming the composite by melt-kneading or the like as described above. However, if done in this way, because the coagulation inhibitor is largely arranged inside the composite, the coagulation inhibition effect with respect to the addition amount of the coagulation inhibitor is reduced. It is more preferable that the coagulation inhibitor is arranged as much as possible in the surface of the composite based on the coagulation inhibiting mechanism. Although examples of the form for arranging the coagulation inhibitor in the surface of the composite include coating and covering, the entire surface of the composite is not necessarily coated. Although the coverage ratio may exceed 100%, when reaching approximately 300% or more, because there are cases where the action of bonding the composite and the fibers is impeded, an appropriate coverage ratio is selected according to the situation.

Although various methods are considered as the method of arranging the coagulation inhibitor in the surface of the composite, although it is possible to exhibit the effect by simply mixing together both and being attached to the surface only by electrostatic force or Van der Waal's forces, the concern of dropping off remains. Therefore, a method of feeding and uniformly mixing the composite and the coagulation inhibitor in a mixer that rotates at high speed is preferable. It is possible to use a known device as such a device, and it is possible to perform mixing using an FM mixer, a Henschel mixer, a super mixer, or the like. It is possible to arrange the particles of the coagulation inhibitor particles in the surface of the composite by such a method. There are cases where at least a portion of the coagulation inhibitor particles arranged by such a method are arranged in a state of biting into or a state of being embedded into the surface of the composite, and it is possible to make the coagulation inhibitor particles more difficult to detach from the composite, and it is possible to stably exhibit the coagulation inhibition effect. When such a method is used, it is possible to easily realize the above-described arrangement in a system included little to no water content. Even if particles that do not bite into the composite are present, it is possible for such an effect to be sufficiently obtained. It is possible for the states in which the coagulation inhibitor particles bite into or are embedded in the surface of the composite to be verified by various electron microscopes.

If the proportion covered by the coagulation inhibitor in the composite surface (area ratio: in the specification, may be referred to as the coverage ratio) is 20% or more to 100% or less, it is possible to obtain a sufficient charging effect. It is possible to adjust the coverage ratio by incorporating in a device such as an FM mixer. If the specific surface area of the coagulation inhibitor and the composite is known, it is possible to perform regulation by the mass (weight) of each component when incorporated. It is possible to measure the coverage ratio with various electron microscopes. In a case where the coagulation inhibitor is arranged in a form of being not easily detached from the composite, it is possible for the coagulation inhibitor to be integrally included in the composite.

When the coagulation inhibitor is arranged in the composite, because coagulation of the composite is made extremely difficult to occur, it is possible for the composite and the fibrous material to be more easily mixed together in the mixing unit 100. That is, when the coagulation inhibitor is arranged in the composite, it is possible for the composite to be quickly diffused in a space and form an extremely uniform mixed material.

Examples of the reason it is possible for the composite and the fibers to be extremely favorably mixed together due to agitation by air currents or a mixer due to the coagulation inhibitor include that the composite tends to be easier to charge with static electricity in a case where the coagulation inhibitor is arranged in the surface of the composite, and coagulation of the composite due to the static electricity is suppressed. According to the research by the inventors, the composite attached to the fibers by to the static electricity becomes less easily detached from the fibers even in cases where a mechanical impact or the like occurs. In light of this trend, in a case where the coagulation inhibitor is arranged in the composite, it is thought that once the composite is attached to the fibers, it is easily made more difficult to detach, and it is thought that the fibers and the composite are quickly mixed together without using another special unit for mixing the fibers and the composite. Attachment of the composite to the fibers after becoming a mixed material is stabilized, and no detachment phenomenon is observed in the composite.

5. GENERAL COMPOSITE

The composite may include other components in addition to the above-described resin, coloring agent, and coagulation inhibitor. Examples of the other components include organic solvents, surfactants, preservative and fungicide agents, antioxidants, ultraviolet absorbing agents, and oxygen absorbing agents.

The type of resin that is a component of the composite of the coloring agent or the coagulation inhibitor may be either a natural resin or a synthetic resin, and may be either a thermoplastic resin or a heat-curable resin. In the sheet manufacturing apparatus 1000 of the embodiment, the resin that configures the composite is preferably a solid at room temperature, and is preferably a thermoplastic resin in consideration of bonding the fibers due to heat in the bonding unit 200.

Examples of the natural resin include rosin, dammar, mastic, copal, amber, shellac, dragon's blood palm resin, sandarac, and colophony, and these resins may be independent or mixed, as appropriate, and may be modified as appropriate.

Examples of the heat-curable resin from the synthetic resins include heat-curable resins such as phenol resins, epoxy resins, melamine resins, urea resins, unsaturated polyester resins, allkyd resins, polyurethane, and heat-curable polyimide resins.

Examples of the thermoplastic resin from the synthetic resins include AS resins, ABS resins, polypropylene, polyethylene, polyvinyl chloride, polystyrene, acrylic resins, polyester resins, polyethylene terephthalate, polyphenylene ether, polybutylene terephthalate, nylon, polyamide, polycarbonate, polyacetal, polyphenylene sulfide, and polyetherether ketone. These resins may be used independently or mixed, as appropriate. Copolymerization or modification may be performed, and examples of such systems of resin include styrene resins, acrylic resins, styrene-acrylic copolymer resins, olefin based, polyvinyl chloride resins, polyester resins, polyamide resins, polyurethane resins, polyvinyl alcohol resins, vinyl ether resins, N-vinyl resins, and styrene-butadiene resins.

In the examples in FIG. 4, although either of the external shape of the composite is schematically shown as close to spherical, the external shape of the composite is not particularly limited, and may be a shape such as disk-shaped and an irregular shape. However, it is more preferable that the shape of the composite approach spherical as much as possible because of the ease of being arranged between the fibers in the mixing unit 100.

The volume average particle diameter d of the crushed composite influences the dispersion situation of the composite in the formed sheet S. In a case where the amount of the composite arranged in the sheet is fixed, although the bonding force between the fibers in parts where the composite is arranged increases when the volume average particle diameter d of the composite is large, because the dispersion (distribution) of the composite in the sheet S surface is coarse and parts were the bonding force between the fibers are possible, the strength as a sheet S lowers. On the other hand, in a case where the amount of the composite arranged in the sheet S is fixed, because the composite is easily uniformly dispersed (distributed) in the sheet S surface when the volume average particle diameter d of the composite is small, the strength as a sheet S also improves.

Although such a suitable volume average particle diameter d depends on the blending amount of the composite in the sheet S, in a case where the blending amount is 5% by mass or more to 70% by mass or less, it is preferable that the volume average particle diameter d is 1 μm or more to 100 μm or less, and 5 μm or more to 35 μm or less is more preferable.

The size (volume average particle diameter d) of the composite is able to be adjusted according to the size (average diameter D) of the fibers that configure the fibrous material. For the size (volume average particle diameter d) of the composite, from the viewpoint of more uniformly mixing the fibers and the composite in the mixing unit 100, it is preferable that the volume average particle diameter d of the composite is smaller than the size (average diameter D) of the particles that configure the fibrous material.

Although the above-described fibers (fibrous material) and composite are mixed together in the mixing unit 100, it is possible for the mixing ratio thereof to be regulated, as appropriate, according to the strength, usage, or the like of the manufactured sheet S. If the manufactured sheet S is for business usage, such as copy paper, the proportion of the composite to the fibers is 5% by mass or more to 70% by mass or less, and from the viewpoints of obtaining favorable mixing in the mixing unit 100 and making the composite less easily influenced by gravity in a case where the mixture is formed in a sheet-shape, 5% by mass or more to 50% by mass of less is preferable.

6. ACTIONS AND EFFECTS

According to the sheet manufacturing apparatus 1000 of the embodiment, even in a state (dry type) with little liquid, it is possible to favorably perform mixing of the fibers and the composite in the mixing unit 100. The composite integrally including a resin and a coloring material is bonded to the fibers in the bonding unit 200. Since the coloring material is easily held by the resin that bonds the fibers to each other, it is possible to manufacture a sheet in which the coloring material is not easily detached by the composite integrally including the resin and the coloring material.

In a case where the coagulation inhibitor is integrated with the resin to make the composite, it is possible to remarkable reduce coagulation of the composites to each other. When the composites coagulate with each other, parts with little composite are possible by the composite gathering in one portion. In the parts with little composite, the bonding force between the fibers becomes low, and the strength as a sheet S is insufficient. When it is possible to reduce the coagulation of the composites to each other, it is possible for the composite to be uniformly dispersed, to create a sheet S with a favorable strength. In a case where the coloring material is integrated with the composite, the coloring material is also uniformly dispersed, and it is possible to create a sheet S in which the uniformity of the tone in the sheet S is favorable (color unevenness is suppressed). In so doing, it is possible for the composite integrally including the fibrous material and the coagulation inhibitor to be uniformly mixed by a dry method, without using moist pulp molding. The dispersion of the resin also becomes favorable, and manufacturing sheet S with excellent strength is possible. By integrating the resin and the coloring material, a sheet S with favorable tone can be manufactured. Since the composite integrally including either or both of the coloring material and the coagulation inhibitor and the resin is uniformly mixed by being mixed with the resin, the effect is exhibited even just by mixing. Although it is difficult whether mixing is uniform in the mixed state, it is easy to verify the strength or the uniformity of tone as a sheet S by bonding the resin and the composite. In a case where the resin and the coloring material and the resin and the coagulation inhibitor are separate bodies, it is probably that there may be cases where a part thereof (for example, 10%) is integrated in the course of transport or usage. However, those integrated afterwards in this way are easily detached, and even if approximately 10% is integrated, the effect is not exhibited. In the present application, since the integrated composite is supplied and 70% or more of the coloring material or the coagulation inhibitor is integrated with the resin, the effects are exhibited.

By suitably adjusting the size of the fibers and particle diameter of the composite, there is no color unevenness, and detachment of the composite from the fibrous material is suppressed. In this way, it is possible to provide a sheet S such as a web, with excellent storability and transportabilty.

According to the sheet manufacturing apparatus 1000 of the embodiment, a sheet S can be manufactured with a method using little to no water, and plumbing facilities and the like at the manufacturing facility are unnecessary. According to the sheet manufacturing apparatus 1000 of the embodiment, achieving size reductions is particularly easy because the water using parts become unnecessary. Therefore, it is possible to increase degree of freedom in the installation location. According to the sheet manufacturing apparatus 1000 of the embodiment, the energy such as electric power for dewatering and drying is unnecessary, and manufacturing a sheet S in a short time not obtained in the pulp molding method while achieving in lowering costs.

7. SHEET MANUFACTURING METHOD

The sheet manufacturing method of the embodiment includes a step of mixing together a composite integrally including fibers and a resin and a coloring material or a resin and a coagulation inhibitor, and a bonding the fibers and the composite together. Because the fibers, the resin, the coloring material, and the composite are the same as those described in the above-described sheet manufacturing apparatus item, detailed description thereof will not be provided.

The sheet manufacturing method of the embodiment may include at least one step selected from a group composed of a step for cutting a pulp sheet or waste paper as a raw material in air, a defibrating step of disentangling the raw material in air into a fibrous form, a classifying step of classifying, in air, impurities (toner or paper strengthening agent) and fibers (short fibers) shortened by defibration from the defibrated material that is defibrated, a screening step of screening, in air, long fibers and undefibrated pieces that are insufficiently defibrated from the defibrated material, a dispersing step of causing the mixture to descend while being dispersed in air, a forming step of forming the descended mixture in a web shape or the like while being deposited, a drying step of causing the sheet to be dried as necessary, a winding step of winding the formed sheet into a roll shape, a cutting step of cutting the formed sheet, and a packaging step of packaging the manufactured sheet. The details of these steps are the same as those described in the above-described sheet manufacturing apparatus, and thus detailed description will not be repeated.

8. SHEET

The sheet S manufactured by the sheet manufacturing apparatus 1000 or the sheet manufacturing method of the embodiment mainly indicates a sheet in which at least the above-described fibers are the raw material and formed into a sheet form. However, there is no limitation to a sheet form, and the shape may be a board form, web form, or a shape having concavities and convexities. The sheets in the specification can be classified into paper and non-woven fabric. Paper includes forms in which pulp or waste paper as a raw material is formed in a sheet shape, and includes recording paper for the purpose of writing or printing, wallpaper, packaging paper, colored paper, image paper, Kent paper and the like. Non-woven fabric is a product thicker than paper or with low strength, and includes ordinary non-woven fabrics, fiber boards, tissue papers, kitchen papers, cleaners, filters, liquid absorbing materials, sound absorbers, shock absorbers, mats, and the like.

9. ACCOMMODATION CONTAINER

The accommodation container of the embodiment accommodates the above-described composite in which the resin and the coagulation inhibitor are integrated, used mixed with the fibers.

The composite of the embodiment is supplied to the mixing unit 100 according to the opening and closing of a feeder or valve. The composite of the embodiment is supplied in a powdered state in appearance. Therefore, it is possible to configure the apparatus so that the composite is directly supplied to the mixing unit 100 through a pipe or the like after being manufactured. However, according to the installation location of the apparatus, it is thought that the composite is carried along a flow path as a commodity, and there are cases where transfer or storage is performed after the composite is manufactured.

The accommodation container of the embodiment includes an accommodation chamber that accommodates the composite, and it is possible for the composite to be accommodated in the accommodation chamber. That is, it is possible for the accommodation container of the embodiment to be a composite cartridge, and it is possible to easily transport and store the composite.

The shape of the accommodation container is not particularly limited, and it is possible for the shape to be made a cartridge shape suitable to the sheet manufacturing apparatus 1000. It is possible to form the accommodation container with an ordinary polymer material. The accommodation container may also be a box-like robust form, or may be a film-(bag) like flexible form. It is preferable that the material that configures the accommodation container is configured from a material with a low glass-transition temperature or melting point compared to the material of the accommodated composite.

The accommodation chamber that accommodates the container is not particularly limited as long as it is able accommodate and hold the composite. It is possible for the accommodation chamber to be formed from a film, a molded body, or the like. In a case where the accommodation chamber is formed by a film, the accommodation container may be formed including a molded body (housing) so as to accommodate the film that forms the accommodation chamber. The accommodation chamber may be formed by a comparatively robust molded body.

The film or molded body that forms the accommodation chamber may be configured from a polymer, a metal deposition film, or the like, and may have a multilayer structure. In a case where the accommodation container is formed by a plurality of members such as a film or molded body, fused parts or bonded parts may be formed. In a case where the accommodated composite (powder) is influenced, such as deterioration, due to contact with the atmosphere, it is preferable that the film or molded body is formed from a material with little gas permeability. It is preferable that the material of the part that contacts the accommodated composite from the materials of the film and molded body that configure the accommodation chamber is stable with respect to the composite.

The shape and volume of the accommodation chamber is not particularly limited. Although the composite is accommodated in the accommodation chamber, an inactive solid or gas may be accommodated in contrast thereto. The volume of the composite accommodated in the accommodation chamber is also not particularly limited.

The accommodation chamber may include a flow port that communicates between the interior of the accommodation chamber and the exterior of the accommodation container, and is able to remove the composite to the outside of the accommodation container. The accommodation chamber may have another flow path other than the flow port formed therein. The other flow path may be configured by a release valve or the like. In a case of providing the release valve in the accommodation chamber, although the position at which the release valve is arranged is not particularly limited, there are cases where providing the release valve is preferable because the composite is not easily discharged when the pressure is released to the atmosphere in cases where pressure and the like is generated in the accommodation chamber when arranged on the opposite side to the direction in which gravity acts in the normal posture when transferred, transported, and used.

10. MODIFICATION AND OTHER PROVISIONS

Although the sheet manufacturing apparatus and sheet manufacturing method of the embodiment use no or only a small amount of water, it is possible to manufacture the sheet while adding water, as appropriate, with the object of adjusting the moisture or the like, through spraying or the like as necessary.

In the specification, the phrasing "uniform" indicates, in a case of uniform dispersion or mixing, the relative positions where one component is present with respect to the other component are even in the entire system or are the same or substantially equal in each part of the system to one another in a substance able to define a component with two types or more or two phases or more. Uniformity of coloring or uniformity of tone indicates an even concentration without tinting of the color when the sheet is seen in plan view. However, in the specification, although the composite is uniformly dispersed and coloring uniformity improves by integrating the coagulation inhibitor and the resin, and is not necessarily limited to being even. Resin that is not integrated is also produced in the step of integrally manufacturing the coagulation inhibitor and the resin. Although coagulation does not occur, the resin enters a state of being somewhat separated from itself. Therefore, even if even, the distance of all of the resin is not the same and the concentration is also not completely the same concentration. When manufactured as a sheet, if in a range in which the tensile strength is satisfied, and if the apparent coloring uniformity is satisfied, the uniformity in the specification is achieved. In the specification, uniformity of coloring, uniformity of tone, and color unevenness are used with the same meaning.

In the specification, phrasing such as "uniform", "same", "even intervals" or the like is used to indicate that density, distance, measurement or the like are the same. Although it is desirable that these are equal, because being made completely equal is difficult, the wording includes being shifted by the cumulative errors or variations without the values being equal.

In a case of mixing powder of the fibers and the resin, if in a state (wet type) in which water is present in the system, as in the related art, because coagulation of the resin (powder) by the action of the water is suppressed, it is comparatively easy to obtain a mixture with a favorable uniformity or obtain a favorable paper. However, in manufacturing a regenerated paper in the present, the technology of consistently manufacturing with a dry method from a waste paper to regenerated paper is not necessarily sufficiently established.

According to the research of the inventors, that there is difficulty in making the step of mixing the fibers and the resin particles a dry method can be understood as one reason thereof. That is, when the fibers and the resin powder are simply mixed without any work in a dry method, in a case where the fibers and the resin powder are not sufficiently mixed and a paper is obtained while being formed (deposited) in a sheet form in this state, it can be understood that the dispersion of the resin in the paper surface is non-uniform, and thus a paper with insufficient mechanical strength is formed. When the fibers and the resin particles are mixed in a dry method, it can be understood that coagulation of the resin particles easily occurs according to coagulation forces such as Van der Waal's force, and that dispersion easily becomes non-uniform.

11. EXAMPLES

Below, although the present disclosure will be further described by the examples shown, the invention is not limited to the examples below.

11.1. Example 1

(1) Structure of Composite Integrally Including Resin and Coloring Material (Integration of Coloring Material to Resin)

1700 parts of polyester resin (manufactured by Toyobo Co., Ltd, brand name "Vylon 220", glass-transition temperature: 54° C., softening point: 96° C.), and 300 parts of blue copper phthalocyanine (manufactured by Toyo Color Co., Ltd., brand name Lionol Blue FG-7330) were processed with a high speed mixer (manufactured by Nippon Coke & Engineering Co., Ltd, brand name "FM-type mixer FM-10C"), and a resin-pigment mixture was obtained. The resin-pigment mixture was supplied from the hopper of a twin screw kneading extruder (manufactured by Toshiba Machine Co., Ltd., trade name "TEM-26SS"), melt-kneading was performed, and the result was pelletized to obtain tablets with a diameter of approximately 3 mm. Since there is no phenomenon of the resin detaching from the time of pelletizing, it is determined that the resin and the coloring material are integrated.

(Size Adjustment of Composite)

After the pellets obtained in the above manner were cooled to the vicinity of room temperature, crushing was performed until particles with a diameter of 1 mm or less were obtained with a hammer mill (manufactured by Dalton Co., Ltd., brand name "Labomill LM-05"). The crushed particles were further crushed by a jet mill (manufactured by Nippon Pneumatic Mfg. Co., Ltd., brand name "PJM-80SP"), and a composite with a maximum particle diameter or 40 μm or less was obtained. The crushed material of the composite was classified by an airflow classifier (manufactured by Nippon Pneumatic Mfg. Co., Ltd., brand name "MDS-3"), and the volume average particle diameter d of the composite was made 10 μm.

(2) Coating Composite With Coagulation Inhibitor 100 parts by weight of the uncoated composite and 1 part by weight of ultrafine particles of titanium dioxide (manufactured by Fuji Titanium Industry Co., Ltd., brand name "SST-30EHJ") as the coagulation inhibitor were fed into a blender (manufactured by Waring Labs, brand name "Waring Blender 7012"), and mixing was performed for 60 seconds at a rotation speed of 15600 rpm. After leaving the composite (integrally including the resin and the coloring material) subjected to this processing to stand for 24 hours in a glass container, no coagulating of the composite to form masses (blocking) was recognized, and the particulate state having liquidity was maintained. In light of this, it is recognized that a state where the coating was formed (integrally including the resin and the coloring material) and there was no coagulation was maintained.

(3) Fiber

Powdered cellulose (Nippon Paper Industries Co., Ltd., brand name "KC FLOCK W-50S") was used. The average diameter of the fibers was 19 μm (below, these fibers are denoted as X).

(4) Manufacturing of Mixed Material 5 parts by weight of the composite material integrally including the resin and the coloring material obtained with (2) above, and 20 parts by weight of the above fibers X were fed into a blender (manufactured by Waring Labs, brand name "Waring Blender 7012"), mixing was performed for 7 seconds at a rotation speed of 3100 rpm, and the composite and the fibers were mixed to obtain the mixed material.

(5) Manufacturing of Sheet 40 parts by weight of the composite material obtained in (4) above was fed to a metal sieve with an opening size of 0.6 mm and a diameter of 200 mm and the composite material was deposited on a fluororesin-coated aluminum desk with a diameter of 180 mm (plate thickness 1 mm) (manufactured by Sumitomo Electric Fine Polymer, Inc., brand name "Sumiflon Coated Aluminum") using an electric sieve shaker device (manufactured by Retsch Ltd., brand name "AS 200").

At this time, a slight 2 parts by weight of the composite remained on the metal sieve. Because the deposited composite material is in the form of a bulky line shape, the composite material was carried on a fluorine coated aluminum plate with the same diameter, pressurized and compressed. After the formed composite material was held for 60 seconds while set on a hot press in a state of being interposed by the aluminum disk, the composite material was drawn out from the pressing machine while the pressure was released and left until reaching room temperature. Thereafter, the sheet (paper) was obtained by removing the hot formed composite material from the aluminum disk.

11.2. Example 2

(1) Structure of Composite Integrally Including Resin and Coloring Material (Integration of Coloring Material to Resin)

Pellets were obtained similarly to Example 1.

(Size Adjustment of Composite)

Up to obtaining the composite with a maximum particle diameter or 40 μm was performed similarly to Example 1. The composite was classified by an airflow classifier (manufactured by Nippon Pneumatic Mfg. Co., Ltd., brand name "MDS-3"), and the volume average particle diameter d of the composite was made 20 μm.

(2) Coating Composite With Coagulation Inhibitor

This was the same as Example 1.

(3) Fiber

This was the same as Example 1.

(4) Manufacturing of Mixed Material

This was the same as Example 1.

(5) Manufacturing of Sheet

This was the same as Example 1.

11.3. Example 3

(1) Structure of Composite Integrally Including Resin and Coloring Material (Integration of Coloring Material to Resin)

This was the same as Example 1.

(Size Adjustment of Composite)

This was the same as Example 1 (10 μm).

(2) Coating Composite With Coagulation Inhibitor

This was the same as Example 1.

(3) Fiber

Kraft paper (manufactured by Oji Materia Co., Ltd., brand name "OK Unbleached Kraft") was cut into paper pieces with a width of 10 mm and a length of 30 mm and linear fibers were obtained by processing these in a dry type pulp defibrating machine (manufactured by Kumagai Riki Kogyo Co., Ltd., No. 2535) at room temperature. The linear fibers were spread on a metal sieve with an opening size of 5 mm, and used with the undefibrated material mixed into the fibers removed. The fiber diameter of the fibers was 33 μm (below, these fibers are denoted as Y).

(4) Manufacturing of Mixed Material 5 parts by weight of the composite obtained with (2) above, and 20 parts by weight of the above fibers Y were fed into a blender (manufactured by Waring Labs, brand name "Waring Blender 7012"), mixing was performed for 7 seconds at a rotation speed of 3100 rpm, and the composite and the fibers were mixed to obtain the mixed material.

(5) Manufacturing of Sheet 40 parts by weight of the mixed material obtained in (4) above was fed to a metal sieve with an opening size of 3 mm and a diameter of 200 m and the composite material was deposited on a fluororesin-coated aluminum desk with a diameter of 180 mm (plate thickness of 1 mm) (manufactured by Sumitomo Electric Fine Polymer, Inc., brand name "Sumiflon Coated Aluminum") using an electric sieve shaker device (manufactured by Retsch Ltd., brand name "AS 200"). At this time, a slight 2 parts by weight of the composite remained on the metal sieve. Because the deposited mixed material is in the form of a bulky line shape, the composite material was carried on a fluorine coated aluminum plate with the same diameter, pressurized and compressed. After the mixed material was held for 60 seconds while set on a hot press in a state of being interposed by the aluminum disk, the composite material was drawn out from the pressing machine while the pressure was released and left until reaching room temperature. Thereafter, the sheet (paper) was obtained by removing the hot formed composite material from the aluminum disk.

11.4. Example 4

(1) Structure of Composite Integrally Including Resin and Coloring Material
(Integration of Coloring Material to Resin)
 This was the same as Example 1.
(Size Adjustment of Composite)
 This was the same as Example 2. (20 μm).
(2) Coating Composite With Coagulation Inhibitor
 This was the same as Example 1.
(3) Fiber
 This was the same as Example 3.
(4) Manufacturing of Mixed Material
 This was the same as Example 3.
(5) Manufacturing of Sheet
 This was the same as Example 3.

11.5. Example 5

(1) Structure of Composite Integrally Including Resin and Coloring Material
(Integration of Coloring Material to Resin)
 This was the same as Example 1.
(Size Adjustment of Composite)
 After the pellets obtained in similarly to Example 1 were cooled to the vicinity of room temperature, crushing was performed until particles with a diameter of 1 mm or less were obtained with a hammer mill (manufactured by Dalton Co., Ltd., brand name "Labomill LM-05"). The crushed particles were further crushed by a jet mill (manufactured by Nippon Pneumatic Mfg. Co., Ltd., brand name "PJM-80SP"), and a composite with a maximum particle diameter or 60 μm or less was obtained. The composite was classified by an airflow classifier (manufactured by Nippon Pneumatic Mfg. Co., Ltd., brand name "MDS-3"), and a composite in which the resin and the coloring material are integrated with volume average particle diameter d of 35 μm was obtained.
(2) Coating Composite With Coagulation Inhibitor
 This was the same as Example 1.
(3) Fiber
 This was the same as Example 3.
(4) Manufacturing of Mixed Material
 This was the same as Example 3.
(5) Manufacturing of Sheet
 This was the same as Example 3.

11.6. Example 6

(1) Structure of Composite Integrally Including Resin and Coloring Material
(Integration of Coloring Material to Resin)
 This was the same as Example 1.
(Size Adjustment of Composite)
 After the pellets obtained similarly to Example 1 were cooled to the vicinity of room temperature, crushing was performed until particles with a diameter of 1 mm or less were obtained with a hammer mill (manufactured by Dalton Co., Ltd., brand name "Labomill LM-05"). The crushed particles were further crushed by a jet mill (manufactured by Nippon Pneumatic Mfg. Co., Ltd., brand name "PJM-80SP"), and a composite with a maximum particle diameter or 25 μm or less was obtained. The composite was classified by an airflow classifier (manufactured by Nippon Pneumatic Mfg. Co., Ltd., brand name "MDS-3"), and a composite in which the resin and the coloring material are integrated with volume average particle diameter d of 5 μm was obtained.
(2) Coating Composite With Coagulation Inhibitor
 100 parts by weight of the uncoated composite obtained in (1) above and 2.5 parts by weight of ultrafine particles of titanium dioxide (manufactured by Fuji Titanium Industry Co., Ltd., brand name "SST-30EHJ") as the coagulation inhibitor were fed into a blender (manufactured by Waring Labs, brand name "Waring Blender 7012"), mixing was performed for 30 seconds at a rotation speed of 15600 rpm, the result was left for 120 seconds, and then further mixing was performed for 30 seconds at the same rotation speed. After leaving the composite subjected to this processing to stand for 24 hours in a glass container, no coagulating of the composite (powder) to form masses (blocking) was recognized, and, the particulate state having liquidity was maintained. In light of this, it is recognized that a state where the coating was formed (integrally including the resin and the coloring material) and there was no coagulation was maintained.
(3) Fiber
 This was the same as Example 1.
(4) Manufacturing of Mixed Material
 This was the same as Example 1.
(5) Manufacturing of Sheet
 This was the same as Example 1.

11.7. Reference Example 1

(1) Structure of Composite Integrally Including Resin and Coloring Material
(Integration of Coloring Material to Resin)
 This was not carried out.
(Size Adjustment of Resin Particles)
 In this example, the composite was not used, and resin particles not integrally including the coloring material were used. 2000 parts (pellets) of polyester resin (manufactured by Toyobo Co., Ltd, brand name "Vylon 220") were roughly crushed until the diameter reached a size of 1 mm or less with a hammer mill (manufactured by Dalton Co., Ltd, brand name "Labomill LM-05"). The resin particle powder was further crushed by a jet mill (manufactured by Nippon Pneumatic Mfg. Co., Ltd., brand name "PJM-80SP"), and a particulate with a maximum particle diameter or 40 μm or less was obtained. The obtained particulate was spread on a metal sieve with 100 μm openings and foreign materials and coarse particles were removed. The particulate was classified by an airflow classifier (manufactured by Nippon Pneumatic Mfg. Co., Ltd., brand name "MDS-3"), and a resin particles with volume average particle diameter d of 10 μm was obtained.
(2) Coating Resin Particles With Coagulation Inhibitor
(Coating Resin Particles with Coagulation Inhibitor)
 This was not carried out.
(3) Fiber
 This was the same as Example 1.
(4) Manufacturing of Mixed Material
 0.75 parts by weight of blue copper phthalocyanine (manufactured by Toyo Color Co., Ltd., brand name Lionol Blue FG-7330), 4.75 parts by weight of the resin particles obtained in (1) above, 0.05 parts by weight ultrafine particles of titanium dioxide (manufactured by Fuji Titanium Industry Co., Ltd., brand name "SST-30EHJ"), and 20 parts by weight of the fibers X in (3) above were fed into a blender (manufactured by Waring Labs, brand name "Waring Blender 7012"), mixed for 7 seconds at a rotation speed of 3100 rpm, to obtain the mixed materials (resin and coloring material become separate bodies) formed from the fibers, the resin particles, the pigment (coloring material), and the coagulation inhibitor.

(5) Manufacturing of Sheet

This was the same as Example 1.

11.8. Reference Example 2

(1) Structure of Composite Integrally Including Resin and Coloring Material (Integration of Coloring Material to Resin)

This was the same as Example 1.

(Size Adjustment of Composite)

After the pellets obtained similarly to Example 1 were cooled to the vicinity of room temperature, crushing was performed until particles with a diameter of 1 mm or less were obtained with a hammer mill (manufactured by Dalton Co., Ltd., brand name "Labomill LM-05"). The powder (particulate) was further crushed by a jet mill (manufactured by Nippon Pneumatic Mfg. Co., Ltd., brand name "PJM-80SP"), and a composite with a maximum particle diameter or 70 μm or less was obtained. The obtained composite was spread on a metal sieve with 100 μm openings and foreign materials and coarse particles were removed. The composite was classified by an airflow classifier (manufactured by Nippon Pneumatic Mfg. Co., Ltd., brand name "MDS-3"), and a composite in which the resin and the coloring material are integrated with volume average particle diameter d of 50 μm was obtained.

(2) Coating Composite With Coagulation Inhibitor

This was the same as Example 1.

(3) Fiber

This was the same as Example 1.

(4) Manufacturing of Mixed Material

This was the same as Example 1.

(5) Manufacturing of Sheet

This was the same as Example 1.

11.9. Reference Example 3

(1) Structure of Composite Integrally Including Resin and Coloring Material (Integration of Coloring Material to Resin)

This was the same as Example 1.

(Size Adjustment of Composite)

After the pellets obtained similarly to Example 1 were cooled to the vicinity of room temperature, the pellets were introduced to a hammer mill (manufactured by Dalton Co., Ltd., brand name "Labomill LM-05") and crushing was performed until particles with a diameter of 1 mm or less were obtained. The crushed product was further crushed by a dry-type crusher (manufactured by Sugino Machine Limited, brand name "Dry Burst DB-180W"), and a composite (particulate) with a maximum particle diameter of 130 μm or less was obtained. The obtained composite was spread on a metal sieve with 400 μm openings and foreign materials and coarse particles were removed. The composite was classified by an airflow classifier (manufactured by Nippon Pneumatic Mfg. Co., Ltd., brand name "MDS-3"), and a composite (with the resin and the coloring material integrated) with volume average particle diameter d of 80 μm was obtained.

(2) Coating Composite With Coagulation Inhibitor

This was the same as Example 1.

(3) Fiber

This was the same as Example 3.

(4) Manufacturing of Mixed Material

This was the same as Example 1.

(5) Manufacturing of Sheet

This was the same as Example 3.

11.10. Reference Example 4

(1) Structure of Composite Integrally Including Resin and Coloring Material (Integration of Coloring Material to Resin)

This was not carried out.

(Size Adjustment of Resin Particles)

Other than not using the composite, and using resin particles to which the coloring material is not integrated, Reference Example 4 was carried out similarly to Reference Example 2, and a particulate with a volume average particle diameter d of 50 μm.

(2) Coating Resin Particles with Coagulation Inhibitor (Coating Resin Particles With Coagulation Inhibitor)

This was not carried out.

(3) Fiber

This was the same as Example 1.

(4) Manufacturing of Mixed Material 0.75 parts by weight of blue copper phthalocyanine (manufactured by Toyo Color Co., Ltd., brand name Lionol Blue FG-7330) 4.75 parts by weight of the resin particles obtained in (1) above, and 20 parts by weight of the fibers X were fed into a blender (manufactured by Waring Labs, brand name "Waring Blender 7012") and mixed for 7 seconds at a rotation speed of 3100 rpm, to obtain the mixed material (resin particles and coloring material become separate bodies) formed from the fibers, the resin particles, the pigment (coloring material), and the coagulation inhibitor.

(5) Manufacturing of Sheet

This was the same as Example 1.

11.11. Measurement and Evaluation Methods (Measurement Method of Particle Diameter)

Measurement of the particle diameter of the composite or the resin particles was performed suspended in water with a wet-type flow-type particle size and particle shape analyzer (manufactured by Sysmex Corporation, brand name "FPIA-2000"). The results thereof are recorded in Table 1. When the composite or the resin particles are suspended, 2 parts by weight of surfactant (manufactured by Kao Corporation, brand name "Emulgen 120") with respect to 100 parts by weight of the suspension liquid were added and subjected to ultrasound treatment for one minute and a state where coagulation of the suspension liquid was resolved was obtained.

(Measurement Method of Fiber Diameter in Fibrous Material)

Measurement of the fiber diameter of the fibrous material was carried out with the fibers suspended in water by a fiber tester (manufactured by Lorentzen & Wettre, "FiberTester"). The average diameter D of the obtained fibers is disclosed in Table 1.

(Relationship Between Volume Average Particle Diameter d of Composite or Resin Particles and Average Diameter D of Fibers in Mixed Material)

For the value of the relationship between the volume average particle diameter d of the composite or the resin particles and the average diameter D of the fibers in the mixed material, the value of d/D and whether or not the relationship of d≤D is satisfied, with a case where satisfied as "○", a case where not satisfied as "×", and a case where satisfied in a range of ±10% of the value as "Δ" are disclosed in Table 1.

(Measurement Method of Tensile Strength of Sheet)

After a test piece (total length 75 mm) of 1BA of JISK 7162 was cut out from the sheet (paper) obtained with the above-described method, and tensile testing was carried out. Compliant with JISK 7161, testing was performed in an environment of a 23° C. room temperature and a relative humidity of 50%. The strength (MPa) value of the breaking point in each example is disclosed in Table 1.

(Evaluation Method of Coloring Uniformity of Sheet (Paper))

A test piece with a width of 15 mm and a length of 120 mm was cut out from a sheet (paper) obtained by the above methods, and the optical reflection density at positions of 20 mm, 40 mm, 60 mm, 80 mm, and 100 mm from the end portion was measured with a spectral densiometer (manufactured by Xrite Incorporated, brand name "X-Rite 528") in cyan mode. When maximum value of the optical reflection density is A and the minimum value is B at this time, the value of C=100×(A−B)/A (%) being 5% or less was determined to be "○" (no color unevenness), a case of more than 5% to 10% or less to be "Δ", and a case where greater than 10% to be "×" (color unevenness present).

(Evaluation Method of Coloring Material Detachment in Sheet (Paper))

The paper was moved while the sheet (paper) obtained with the above-described methods was pinched to a pinching body with a pressure of 981 Pa. Cases where the coloring material attached to the pinching body are recorded as "×" (detachment present, not acceptable) in Table 1, and cases where not attached as "○" (no detachment, no problem). This may serve as an evaluation of whether the coloring material attached to a finger when the paper is rubbed with the finger.

(Quality Determination of Sheet (Paper))

Functional testing for the sheet (paper) obtained with each example was performed. The tactile sensation, feel, and external appearance of the paper of each example was verified by 20 men and women of the ages of 20 to 50, and cases where 15 or more determined that the paper could withstand use as a paper are disclosed in Table 1 as "○" and cases where not determined as "×".

11.12. Experimental Results

The characteristics of the samples, type of fibrous material, fiber diameter of the fibrous material, configuration of the composite or resin particles, tensile strength of the sheet (paper), detachment of the coloring material in the sheet (paper), coloring uniformity of the sheet (paper), and quality evaluation results for each example and each reference example are summarized in Table 1.

TABLE 1

| | Composite | | | Fibrous Material | | |
|---|---|---|---|---|---|---|
| | Volume Average Particle Diameter d (μm) of Composite | Form of Integration of Colored Material | Form of Integration of Coagulation Inhibitor | Type | Average Diameter D (μm) of Fibers | Mixed Material Value of d/D |
| Example 1 | 10 | Integrated | Integrated | Fibers X | 19 | 0.53 |
| Example 2 | 20 | Integrated | Integrated | Fibers X | 19 | 1.05 |
| Example 3 | 10 | Integrated | Integrated | Fibers Y | 33 | 0.30 |
| Example 4 | 20 | Integrated | Integrated | Fibers Y | 33 | 0.61 |
| Example 5 | 35 | Integrated | Integrated | Fibers Y | 33 | 1.06 |
| Example 6 | 5 | Integrated | Integrated | Fibers X | 19 | 0.26 |
| Reference Example 1 | 10 | Separate | Separate | Fibers X | 19 | 0.53 |
| Reference Example 2 | 50 | Integrated | Integrated | Fibers X | 19 | 2.63 |
| Reference Example 3 | 80 | Integrated | Integrated | Fibers Y | 33 | 2.42 |
| Reference Example 4 | 50 | Separate | Not added | Fibers X | 19 | 2.63 |

| | | | Sheet | | |
|---|---|---|---|---|---|
| | Mixed Material Determination of d ≤ D | Tensile Strength (MPa) | Coloring Uniformity | Detachment of Colored Material | Quality Determination |
| Example 1 | ○ | 41 | ○ | ○ | ○ |
| Example 2 | Δ | 39 | ○ | ○ | ○ |
| Example 3 | ○ | 61 | ○ | ○ | ○ |
| Example 4 | ○ | 62 | ○ | ○ | ○ |
| Example 5 | Δ | 52 | ○ | ○ | ○ |
| Example 6 | ○ | 39 | ○ | ○ | ○ |
| Reference Example 1 | ○ | 10 | × | × | × |
| Reference Example 2 | × | 11 | ○ | ○ | × |

TABLE 1-continued

| | | | | | |
|---|---|---|---|---|---|
| Reference Example 3 | x | 19 | ○ | ○ | x |
| Reference Example 4 | x | 9 | x | x | x |

In Reference Examples 1 and 4 in which the composite not integrally including the resin and the coloring material, that is a mixture in which the resin and the coloring material are separate bodies, detachment of the coloring material was observed. In contrast, in each of the other examples in which the composite integrally including the resin and the coloring material, detachment of the coloring material was not observed. It is recognized that there was almost no detachment because the coloring material is bonded to the fibers via the resin by the composite integrally including the resin and the coloring material. Meanwhile, in a case where the resin and the coloring material are simply mixed together, because the coloring material is bonded to the fibers without the resin, it is recognized that the coloring material detaches with a pressure approximating rubbing with a finger.

The coloring uniformity was favorable for Examples 1 to 6 using the composite integrally including the resin and the coagulation inhibitor. This is because coagulation of the composite is suppressed, and the composite is uniformly dispersed by using the composite in which the resin is integrated by being coating with the coagulation inhibitor. In light of this, it can be said that when the resin and the coagulation inhibitor are integrated, an effect is exhibited in which the resin is uniformly dispersed.

The tensile strength of the sheet was more favorable for Examples 1 to 6 using the composite integrally including the resin and the coagulation inhibitor than in the Reference Example 2 in which the resin and the coagulation inhibitor are separate bodies. This is because, although the coagulation inhibition effect is present in a case where the resin and the coagulation inhibitor are separate bodies and in a case where the coagulation inhibitor is arranged between the resin, the resin coagulates with the resin in a case where there is no coagulation inhibitor between the resin, and the resin is not uniformly dispersed. Therefore, locations where the fibers are not bonded to the fibers by the resin, and the strength as a sheet is lowered. Meanwhile, the resin is uniformly dispersed when the resin and the coagulation inhibitor are integrated, favorable values are achieved without lowering the strength as a sheet.

It was determined from Reference Examples 2 to 4 that when d/D greatly exceeds one, the tensile strength degrades. This is because when the diameter of the composite is large, the amount of composite (number of particles) is reduced when the same weight of composite is mixed with the fibers, and the number of composite particles bonding the fibers to the fibers is reduced. It is thought that the composite not easily entering between fibers due to the diameter of the composite being large also contributes. Although d/D in Reference Examples 2 and 5 slightly exceeds one, the tensile strength does not degrade. Therefore, it can be said that there are no problems of tensile strength if d/D is one or less. Because d/D is one or less, the size of the composite becomes the thickness of the fibers or less. In light of the results of Examples 1, 3, 4, and 6, it is recognized that there is no problem even if the diameter of the fibers or the resin is changed if d≤D is satisfied. In light of the results of Example 6, it is preferable that d/D is 0.26 or more, and in light of the results of Example 3, 0.30 or more is more preferable.

As is evident from Table 1, it is determined that the coloring material (pigment) being integrated with the composite, and the composite being coated with the coagulation inhibitor (coagulation inhibitor is also integrated with the composite) are extremely effective in order to resolve detachment of the coloring material (pigment) from the mixed material in a case of adding the coloring material (pigment) in order to color the mixed material. It is thought that this is because the composite and the coloring material are dispersed in the same way, and it is understood that this is also effective is a wet-method.

In methods (external addition) of mixing the coagulation inhibitor, fibers and composite together that are not integrated with respect to the composite (separate), because the effect of suppressing coagulation of the composite is reduced and not resolved when the coagulation of the composite is not resolved, it is recognized that sufficiently uniformly mixing the fibers and the composite is difficult.

In contrast, after the composite is coated (integrated) with the coagulation inhibitor, it was determined that a mixed material and sheet with superior coloring uniformity was obtained by mixing with the fibers. That is, it is recognized that it is effective to integrate the pigment (coloring material) for the composite in order to reduce the color unevenness of the mixed material and the sheet and to increase the color uniformity. There is also an effect of being easily dispersed between fibers by the composite being a powder rather than sheath-like.

As is evident from Table 1, it is recognized that the obtained sheet (paper) has the characteristics of superior uniformity of coloring (uniformity of tone) after formation and superior tensile strength by forming the sheet using the mixed material in which the composite integrally including either or both of the coloring agent and the coagulation inhibitor with the resin and the fibers. In order to obtain such a sheet (paper), it is understood that it is extremely effective to form the sheet with the composite integrally including the pigment and the coagulation inhibitor integrated into the composite, and using a mixed material in which the relationship "volume average particle diameter d of composite≤average diameter D of fiber" is satisfied.

The present disclosure is not limited to the embodiments described above, and further, various modifications thereof are possible. For example, the invention includes configurations which are substantially the same as the configurations described in the embodiments (for example, configurations having the same function, method, and results, or configurations having the same purpose and effect). The invention includes configurations in which non-essential parts of the configurations described in the embodiments are replaced. The invention includes configurations exhibiting the same actions and effects as the configurations described in the embodiments or configurations capable of achieving the same object. The invention includes configurations in which known techniques were added to the configurations described in the embodiments.

The invention is suitable to a sheet in which a tensile strength of 39 MPa or more is demanded. Generally, a higher value of tensile strength is demanded for a paper than for a non-woven fabric. This is because it is a cause of breakdown when used in a printer or the like. Therefore, since the paper is more suitable than a non-woven fabric, the sheet may be replaced with a paper. However, it is not problematic if the non-woven fabric is used.

According to an aspect, there is provided a sheet manufacturing apparatus including a mixing unit in which fibers and a composite integrally including a resin and a coloring material are mixed, and a bonding unit that bonds the fibers and the composite.

According to such a sheet manufacturing apparatus, the composite integrally includes a coloring material and a resin and thus the coloring material is not easily detached from the composite. Since the composite and the fibers are bonded, the coloring material is also not easily detached from the fibers. Therefore, it is possible to manufacture a sheet in which color unevenness is suppressed.

In the sheet manufacturing apparatus according to the aspect, the composite may further integrally include a coagulation inhibitor.

According to such a sheet manufacturing apparatus, since the composite also integrally includes a coagulation inhibitor, it is possible to suppress coagulation of the composite in the vicinity. In a case where the composite includes the coagulation inhibitor as a separate body, the coagulation inhibition effect is not exhibited if the coagulation inhibitor is not present between the composite and another composite, in contrast, because the coagulation inhibitor is integrally included if the composite according to the aspect is used, it is possible to reliably exhibit the coagulation inhibition effect. Therefore, because it is possible for the composite to be dispersed and mixed with respect to the fibers in the mixing unit, and more uniform mixing is performed, it is possible to manufacture a sheet with higher mechanical strength, and more favorable uniformity of the tone.

In the sheet manufacturing apparatus according to the aspect, the composite may be a powder.

According to such a sheet manufacturing apparatus, since the composite easily enters between fibers because the composite is a powder compared to another shape of composite, such as a sheath shape, in the mixing unit, a more uniform mixture is possible, and it is possible to manufacture a sheet with higher mechanical strength and more favorable uniformity of the tone.

In the sheet manufacturing apparatus according to the aspect, the size of the composite may be the thickness of the fibers or less.

According to such a sheet manufacturing apparatus, because the size of the composite is the thickness of the fibers or less, the composite easily enters between the fibers in contrast to not easily entering between the fibers when the size of the composite is larger than the thickness of the fibers, and because mixing is more uniformly performed in the mixing unit, it is possible to manufacture a sheet with higher mechanical strength, and more favorable uniformity of the tone.

In the sheet manufacturing apparatus according to the aspect, the coloring material may be encapsulated in the resin.

According to such a sheet manufacturing apparatus, because the coloring material is positioned further to the inside than the surface of the resin, the coloring material does not easily drop off from the resin even by friction such as rubbing the manufactured sheet with a finger, and it is possible to manufacture a favorable sheet with a more uniform tone.

According to another aspect of the invention, there is provided a sheet manufacturing method including a step of mixing fibers and a composite integrally including a resin and a coloring material; and a step of bonding the fibers and the composite.

According to such as sheet manufacturing method, since the coloring material is easily held by the resin of the composite, it is possible to manufacture a sheet in which the coloring material is not easily detached.

According to still another aspect, there is provided a sheet including a raw material including fibers and a composite integrally including a resin and a coloring material, in which the fibers and the composite are bonded.

Since the coloring material is held by the resin of the composite in such a sheet, the coloring material is not easily detached.

According to still another aspect, there is provided an accommodation container which accommodates a composite used to be mixed with the fibers and integrally including the resin and the coloring material.

It is possible for such an accommodation container to easily transport and hold the composite.

According to still another aspect, there is provided a composite integrally including a resin and a coloring material and used to be mixed with the fibers.

Since the coloring material is easily held by the resin when such a composite is mixed with the fibers, the coloring material is not easily detached.

According to still another aspect, there is provided a composite used in a sheet manufacturing apparatus and integrally including the resin and the coloring material.

Since the coloring material is easily held by the resin in such a composite, the coloring material is not easily detached from the manufactured sheet.

According to still another aspect, there is provided a sheet manufacturing apparatus including a mixing unit in which fibers and a composite integrally including a resin and a coagulation inhibitor are mixed, and a bonding unit that bonds the fibers and the composite.

According to such a sheet manufacturing apparatus, because the composite integrally includes the coagulation inhibitor and the resin, coagulation of the resin is suppressed. Therefore, the resin is dispersed in the entire sheet and it is possible to manufacture a high strength sheet.

In the sheet manufacturing apparatus, the composite may be a powder.

According to such a sheet manufacturing apparatus, because the composite is a powder, compared to another shape of composite, such as a sheath shape, the composite easily enters between the fibers during mixing. Therefore, more uniform mixing is possible, and it is possible to manufacture a high strength sheet.

According to still another aspect, there is provided a sheet manufacturing method including a step of mixing fibers and a composite integrally including a resin and a coagulation inhibitor; and a step of bonding the fibers and the composite.

According to such a sheet manufacturing method, the resin does not easily coagulate due to the coagulation inhibitor integrated with the resin, and it is possible to manufacture a high strength sheet.

According to still another aspect, there is provided a sheet including a raw material including fibers and a composite integrally including a resin and a coagulation inhibitor, in which the fibers and the composite are bonded.

In such a sheet, the resin does not easily coagulate due to the coagulation inhibitor integrated with the resin, and the strength becomes high.

According to still another aspect, there is provided an accommodation container which accommodates a composite used mixed with fibers and integrally including the resin and the coagulation inhibitor.

It is possible for such an accommodation container to easily transport and hold the composite.

According to still another aspect, there is provided a composite integrally including a resin and a coagulation inhibitor and used mixed with the fibers.

Since the resin does not easily coagulate due to the integrated coagulation inhibitor when such a composite is mixed with the fibers, the resin is easily dispersed with respect to the fibers.

According to still another aspect, there is provided a composite used in a sheet manufacturing apparatus and integrally including the resin and the coagulation inhibitor.

Since the resin does not easily coagulate due to the integrated coagulation inhibitor in such a composite, the resin is easily dispersed across the entire sheet. Therefore, since it is possible to manufacture a high strength sheet, effective use in the sheet manufacturing apparatus is possible.

REFERENCE SIGNS LIST 1 resin
2 coloring material (coagulation inhibitor)
3 resin particles
4 mother particles
5 shell
10 crushing unit
11 crushing blade
15, 16 hopper
20 defibrating unit
21 introduction port
22 discharge port
30 classifying unit
31 introduction port
34 lower discharge port
35 upper discharge port
40 screening unit
46 introduction port
47 discharge port
60 distribution unit
66 introduction port
70 sheet forming unit
72 deposition unit
74 tension roller
76 heater roller
77 tension roller
78 winding roller
80 drying unit
81 first conveyance unit
82 second conveyance unit
83 third conveyance unit
84 fourth conveyance unit
85 fifth conveyance unit
86 sixth conveyance unit (pipe)
90 winding unit
92 cutting unit
94 packaging unit
100 mixing unit
150 composite supplying unit
151 supply port
200 bonding unit
1000 sheet manufacturing apparatus

The invention claimed is:

1. A composite integrally including a resin and a coagulation inhibitor, and used to be mixed with fibers, the composite being a powder whose volume average particle diameter is 1 μm or more to 100 μm or less, at least a portion of the coagulation inhibitor being arranged in a surface of the composite.

2. The composite according to claim 1,
wherein the composite is a powder whose volume average particle diameter is 5 μm or more to 35 μm or less.

3. The composite according to claim 1,
wherein a proportion covered by the coagulation inhibitor in the surface of the composite is 20% or more to 100% or less.

4. The composite according to claim 1,
wherein a number average particle diameter of particles of the coagulation inhibitor particles is 0.001 to 1 μm.

5. The composite according to claim 1,
wherein an addition amount when the coagulation inhibitor is added to the composite is 0.1 parts by weight or more to 5 parts by weight or less with respect to 100 parts by weight of the composite.

6. A composite used in a sheet manufacturing apparatus and integrally including a resin and a coagulation inhibitor, the composite being a powder whose volume average particle diameter is 1 μm or more to 100 μm or less, at least a portion of the coagulation inhibitor being arranged in a surface of the composite.

7. The composite according to claim 6,
wherein the composite is a powder whose volume average particle diameter is 5 μm or more to 35 μm or less.

8. The composite according to claim 6,
wherein a proportion covered by the coagulation inhibitor in the surface of the composite is 20% or more to 100% or less.

9. The composite according to claim 6,
wherein a number average particle diameter of particles of the coagulation inhibitor is 0.001 to 1 μm.

10. The composite according to claim 6,
wherein an addition amount when the coagulation inhibitor is added to the composite is 0.1 parts by weight or more to 5 parts by weight or less with respect to 100 parts by weight of the composite.

11. A sheet comprising:
a raw material including fibers and a composite integrally including a resin and a coagulation inhibitor, the composite being a powder whose volume average particle diameter is 1 μm or more to 100 μm or less, at least a portion of the coagulation inhibitor being arranged in a surface of the composite,
wherein the fibers and the composite are bonded.

12. A sheet manufacturing apparatus comprising:
a mixing unit in which the composite according to claim 1 and the fibers are mixed, the mixing unit including a composite supplying unit that supplies the composite to the fibers; and
a bonding unit that bonds the fibers and the composite.

13. A sheet manufacturing apparatus comprising:
a mixing unit in which the composite according to claim 6 and the fibers are mixed, the mixing unit including a composite supplying unit that supplies the composite to the fibers; and
a bonding unit that bonds the fibers and the composite.

* * * * *